(12) United States Patent
Teramoto et al.

(10) Patent No.: US 9,268,327 B2
(45) Date of Patent: Feb. 23, 2016

(54) SUBSTRATE PROCESSING APPARATUS AND SUBSTRATE PROCESSING METHOD

(71) Applicant: Tokyo Electron Limited, Tokyo (JP)

(72) Inventors: Akihiro Teramoto, Koshi (JP); Tokutarou Hayashi, Koshi (JP)

(73) Assignee: Tokyo Electron Limited, Minato-Ku (JP)

( * ) Notice: Subject to any disclaimer, the term of this patent is extended or adjusted under 35 U.S.C. 154(b) by 398 days.

(21) Appl. No.: 13/759,515

(22) Filed: Feb. 5, 2013

(65) Prior Publication Data

US 2013/0211571 A1 Aug. 15, 2013

(30) Foreign Application Priority Data

Feb. 9, 2012 (JP) ................................. 2012-026387

(51) Int. Cl.
G05B 19/418 (2006.01)
B25J 9/16 (2006.01)

(52) U.S. Cl.
CPC ........... *G05B 19/4189* (2013.01); *B25J 9/1612* (2013.01); *G05B 2219/39479* (2013.01); *G05B 2219/39508* (2013.01)

(58) Field of Classification Search
CPC ................. G05B 19/4189; G05B 2219/39508; G05B 2219/39479; B25J 9/1612
See application file for complete search history.

(56) References Cited

FOREIGN PATENT DOCUMENTS

| JP | 09-138256 | 5/1997 |
|---|---|---|
| JP | 10-163302 A1 | 6/1998 |
| JP | 11-026539 | 1/1999 |
| JP | 2000-210890 | 8/2000 |
| JP | 2001-022423 | 1/2001 |
| JP | 2005-019963 | 1/2005 |
| JP | 2006-351884 | 12/2006 |
| JP | 2010-272743 | 12/2010 |

*Primary Examiner* — Ryan Jarrett
(74) *Attorney, Agent, or Firm* — Burr & Brown, PLLC

(57) ABSTRACT

A technique which, when transporting a substrate from one module to another, detects a displacement of the substrate on a holding member and transfers the substrate to another module with the displacement within an acceptable range. Displacement of a wafer on a fork of a transport arm from a reference position is determined when the fork has received the wafer from one module and, when the displacement is within an acceptable range, the wafer is transported by the transport arm to another module. When the displacement is out of the acceptable range, the wafer is transported by the transport arm to a wafer stage module, and then the transport arm receives the wafer from the wafer stage module so that the displacement comes to fall within the acceptable range. The wafer can therefore be transferred to another module with the displacement within the acceptable range.

24 Claims, 26 Drawing Sheets

SUBSTRATE PROCESSING APPARATUS AND SUBSTRATE PROCESSING METHOD

CROSS-REFERENCE TO RELATED APPLICATION

This application claims the priority benefit of Japanese Patent Application No. 2012-026387, filed on Feb. 9, 2012, the disclosure of which is incorporated herein by reference in its entirety.

TECHNICAL FIELD

The present invention relates to a substrate processing apparatus and method for processing a substrate while transporting the substrate from one module to another by means of a substrate transport mechanism.

BACKGROUND ART

In a process for manufacturing a semiconductor device or an LCD substrate, predetermined processing of a substrate is performed while the substrate is sequentially transported by a substrate transport device between a plurality of processing modules provided in a substrate processing apparatus. The substrate transport device includes, for example, a fork for holding a substrate and which is movable back and forth along a base. The base is configured to be rotatable on a vertical axis and vertically movable.

A substrate, held in a reference position on such a fork, is transferred to a reference position of the substrate holding area of a module. The "reference position" herein refers to e.g. a position where the center of a substrate coincides with the center of the holding area of a fork or a module. Thus, a substrate which has been transferred from a module to a reference position on a fork, is transferred to a reference position in the next module.

However, there are cases where a fork receives a substrate from a module at a position displaced from a reference position on the fork, for example, on the occurrence of an earthquake, or when the substrate bounces off the fork upon transfer of the substrate from the module and is caught by the fork at a position largely displaced from the reference position. The bouncing of a substrate is likely to occur when the substrate is lifted up from a substrate holding surface upon transfer of the substrate under tension between the substrate holding surface and a chemical solution which has intruded into the back surface side of the substrate.

If a substrate, held in a position displaced from a reference position on a fork, is transferred to a module, there is a fear of collision of the substrate with the module, or falling of the substrate from the fork during transport. It is therefore common practice to stop the transport of the substrate; and an operator enters the apparatus and performs a work to reset the substrate in the reference position on the fork, or remove the substrate from the fork.

The stopping of the apparatus, the resetting or removal of the substrate and a work to restore the apparatus must be performed by a worker. A heavy burden is thus imposed on the worker. In addition, it takes a certain amount of time to perform such a work and restore the apparatus, resulting in lowering of the operating rate of the apparatus.

Patent document 1 describes a technique which involves detecting a displacement of a substrate which has occurred during transport of the substrate from a first position to a second position, correcting the displacement, and subsequently performing fine alignment. This patent document, however, fails to address the problem of how to transfer a substrate to a normal position in a substrate transport device or in a module when the displacement of the substrate is large, and the technique disclosed cannot solve the problem.

PRIOR ART DOCUMENT

Patent document 1: Japanese Patent Laid-Open Publication No. H10-163302

SUMMARY OF THE INVENTION

The present invention has been made in view of the above situation. It is therefore an object of the present invention to provide a technique which, when transporting a substrate from one module to another, can detect a displacement of the substrate on a holding member and can transfer the substrate to the another module with the displacement within an acceptable range.

In order to achieve the object, the present invention provides a substrate processing apparatus comprising: a substrate transport mechanism for transferring a substrate from one module to another module, said mechanism including a horizontally movable holding member for holding a substrate; a detection section for detecting the position of the substrate on the holding member after the holding member has received the substrate from the one module and before the holding member transports the substrate to the another module; a calculating section for determining a displacement of the substrate on the holding member from a reference position based on the results of detection by the detection section; a substrate stage module for temporarily placing thereon the substrate which the substrate transport mechanism has received from the one module; and a control section configured to compare a detected displacement value, obtained in the calculating section, with an acceptable range of displacement and, when the detected displacement value is within the acceptable range, output a control signal to cause the substrate transport mechanism to transport the substrate to the another module, or when the detected displacement value is out of the acceptable range, output a control signal to cause the substrate transport mechanism to transfer the substrate to the substrate stage module, and then receive the substrate from the substrate stage module so that a detected displacement value comes to fall within the acceptable range.

The present invention also provides a substrate processing method for carrying out processing of a substrate while transporting the substrate from one module to another module by a substrate transport mechanism including a horizontally movable holding member for holding a substrate, said method comprising the steps of: detecting the position of the substrate on the holding member after the holding member has received the substrate from the one module and before the holding member transports the substrate to the another module; determining a displacement of the substrate on the holding member from a reference position based on the results of the detection; and comparing the detected displacement value with an acceptable range of displacement and, when the detected displacement value is within the acceptable range, transporting the substrate to the another module by the substrate transport mechanism, or when the detected displacement value is out of the acceptable range, transferring the substrate to a substrate stage module, and then receiving the substrate from the substrate stage module so that a detected displacement value comes to fall within the acceptable range.

According to the present invention, a displacement of a substrate on the holding member from the reference position is determined when the holding member has received the substrate from one module. When the displacement is within an acceptable range, the substrate is transported to another module by the substrate transport mechanism, whereas when the displacement is out of the acceptable range, the substrate is transported to a substrate stage module. The substrate transport mechanism transfers/receives the substrate to/from the substrate stage module so that the displacement of the substrate comes to fall within the acceptable range. Accordingly, the substrate can be transferred to another module with the displacement within the acceptable range.

DETAILED DESCRIPTION OF THE INVENTION

Figure 1:
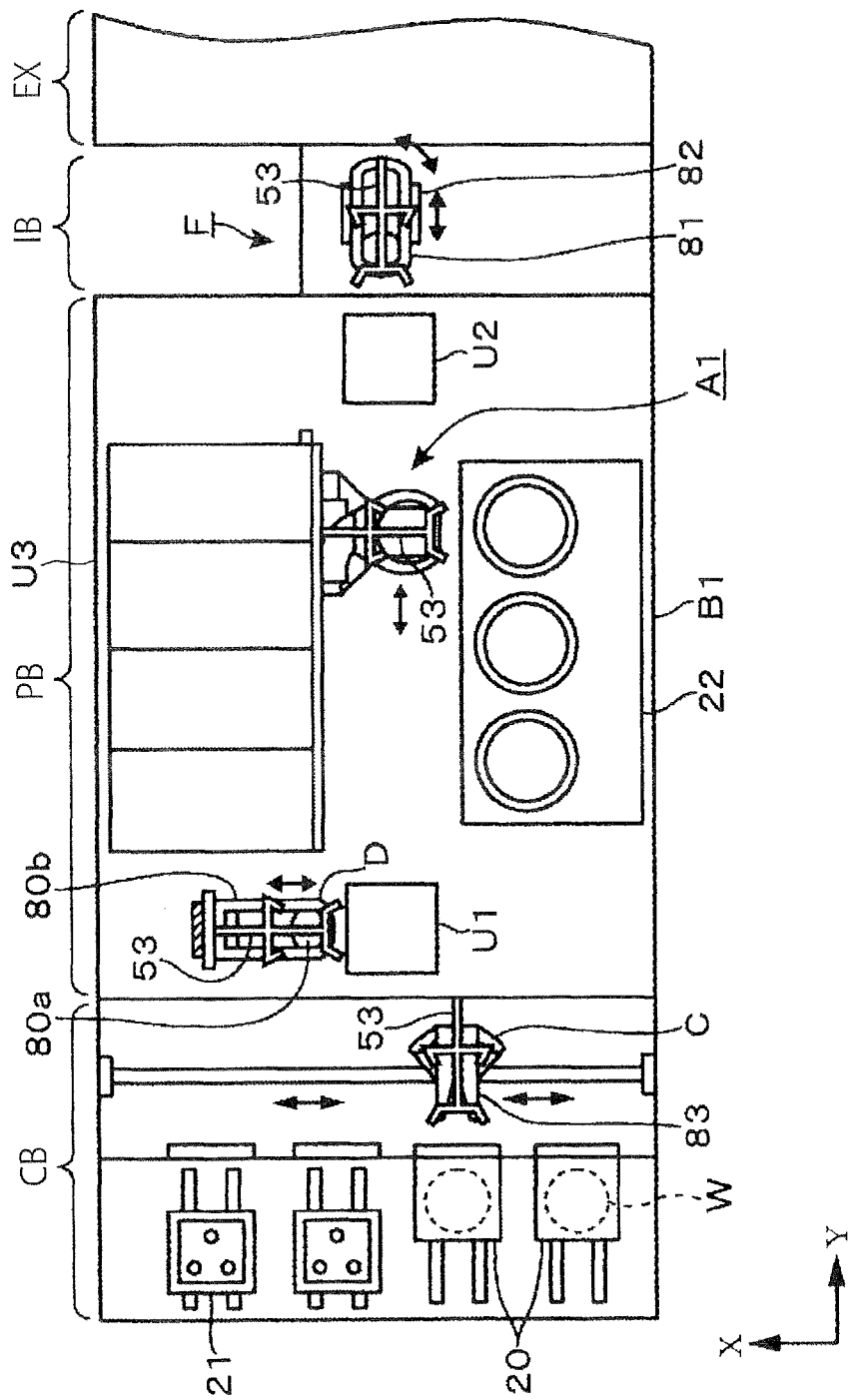
FIG. 1 is a plan view of a resist pattern forming apparatus according to an embodiment of the present invention.
Figure 2:
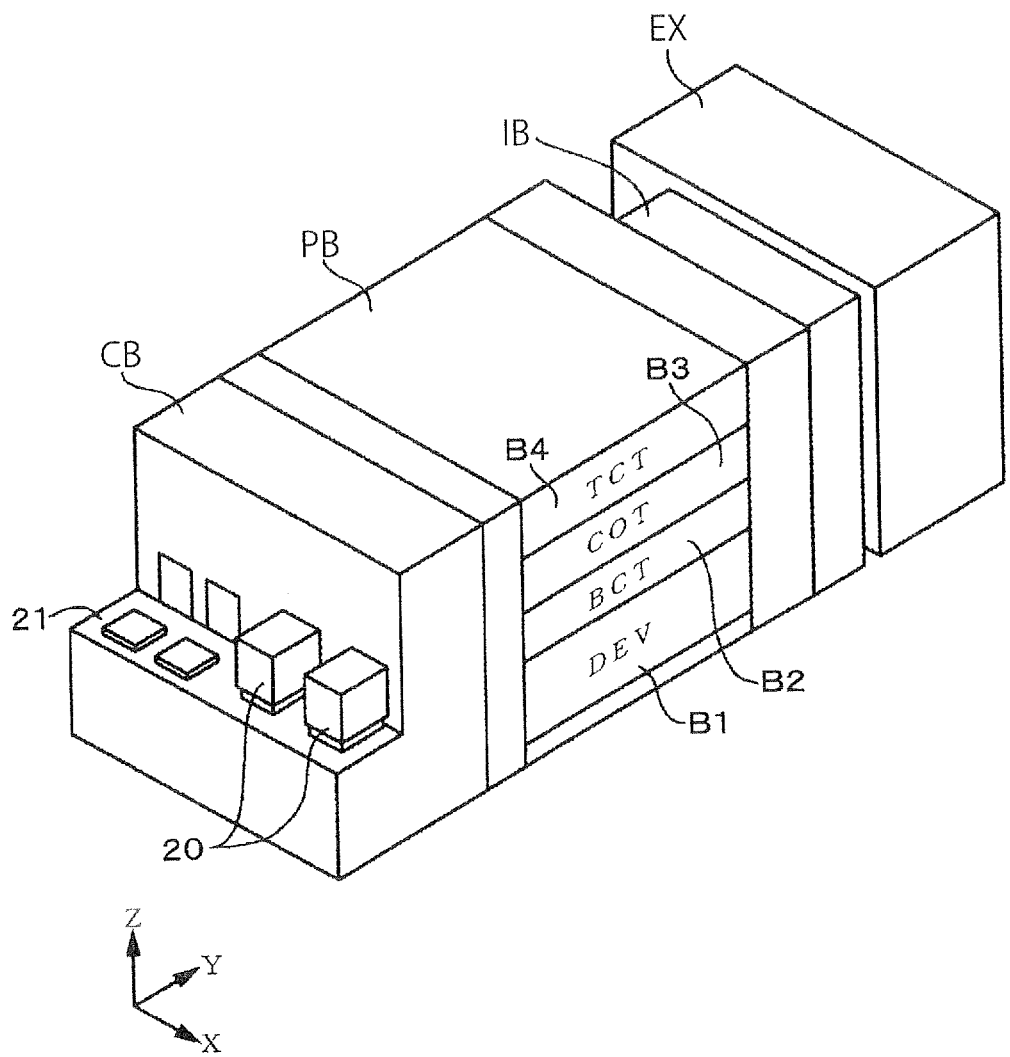
FIG. 2 is a perspective view of the resist pattern forming apparatus.

A substrate processing apparatus according to the present invention, provided with a substrate transport device, will now be described with reference to the case where the present invention is applied to a coating/developing apparatus. At the outset, a resist pattern forming apparatus, having an exposure apparatus connected to the coating/developing apparatus, will be described briefly with reference to the drawings. FIG. 1 shows a plan view of the resist pattern forming apparatus according to an embodiment of the present invention, and FIG. 2 shows a schematic perspective view of the resist pattern forming apparatus. The apparatus includes a carrier block CB. In the carrier block CB, a transfer means C takes a semiconductor wafer W (hereinafter simply referred to as a "wafer") as a substrate out of a closed carrier 20 placed on a stage 21 and transfers the wafer W to a processing block PB adjacent to the carrier block CB. On the other hand, the transfer means C receives a processed wafer W which has undergone processing in the processing block PB and transfers the wafer W to the carrier 20.

As shown in FIG. 2, in this embodiment the processing block PB is comprised of a stack of a first block (DEV layer) B1 for performing developing processing, a second block (BCT layer) B2 for forming an antireflective film underlying a resist film, a third block (COT layer) B3 for applying a resist solution onto the antireflective film to form a resist film, and a fourth block (TCT layer) B4 for forming an antireflective film overlying the resist film.

The second block (BCT layer) B2 and the fourth block (TCT layer) B4 each include a coating module for spin-coating a chemical solution for forming an antireflective film, a plurality of heating/cooling modules for performing pre-processing and post-processing before and after the processing in the coating module, and a transport arm A2 or A4, provided between the coating module and the processing modules, for transferring a wafer W between them. The third block (COT layer) B3 has the same construction as that of the second block except for using a resist solution instead of the antireflective film-forming solution.

With reference to the first block (DEV layer) B1, a two-layer stack of developing modules 22 is provided in one DEV layer B1. Further, a transport arm A1 for transporting a wafer W to the two-layer developing modules 22 is provided in the DEV layer B1. Thus, the transport arm A1 is common to the two-layer developing modules 22.

Figure 3:
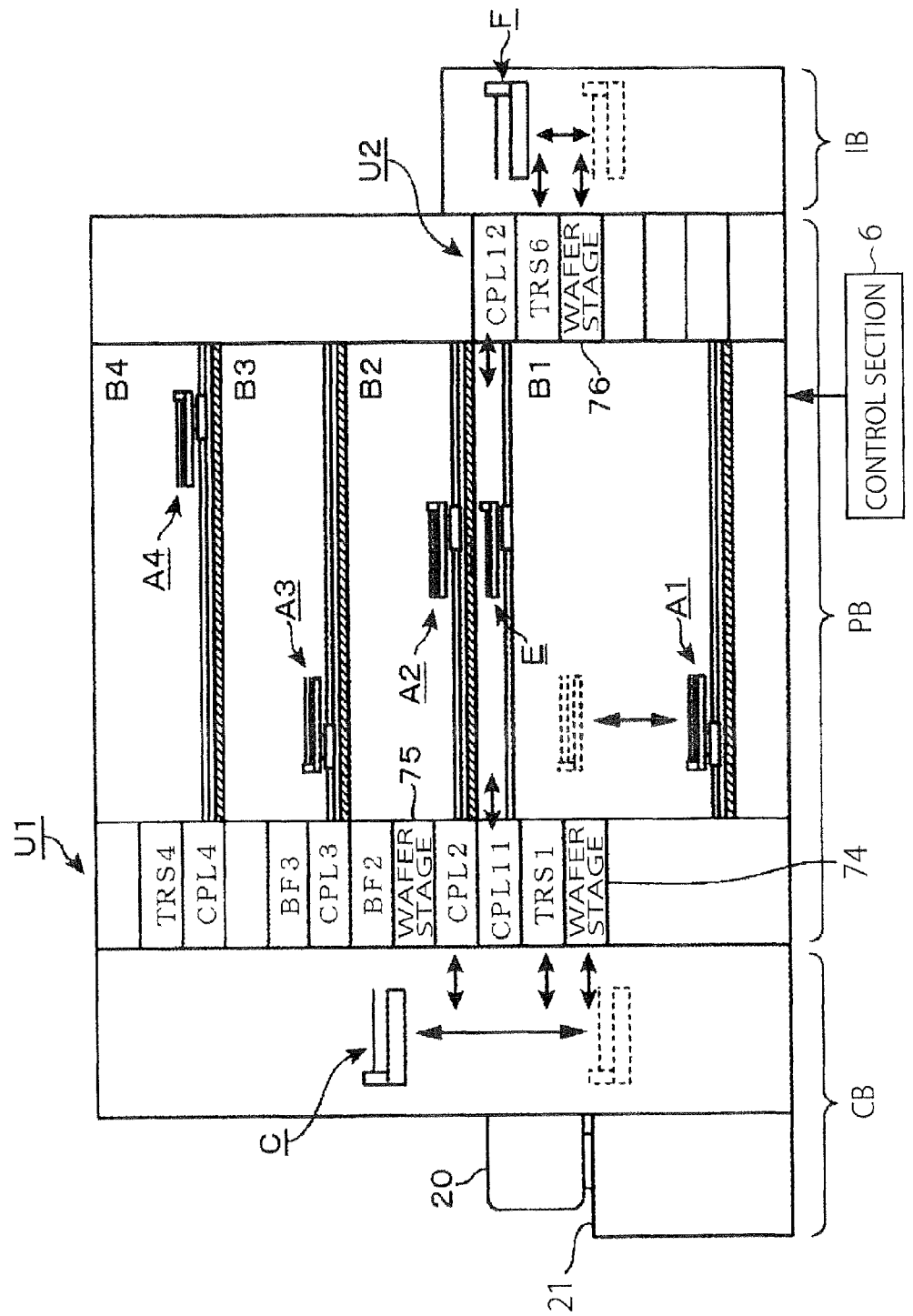
FIG. 3 is a sectional side view of the resist pattern forming apparatus.

As shown in FIGS. 1 and 3, the processing block PB is provided with a shelf unit U1. A wafer W is transported between modules provided in the shelf unit U1 by a vertically movable transfer arm D provided in the vicinity of the shelf unit U1. The flow of transportation of a wafer W will now be described briefly. Wafers W from the carrier block CB are sequentially transported by the transfer means C to one of the transfer modules of the shelf unit U1, e.g. a transfer module CPL2 corresponding to the second block (BCT layer) B2. The transport arm A2 of the second block (BCT layer) B2 receives a wafer W from the transfer module CPL2, and transports the wafer W to the modules (the coating module and the heating/cooling modules) to form an antireflective film on the wafer W.

Thereafter, the wafer W is carried into the third block (COT layer) B3 via the transfer module BF2 of the shelf unit U1, the transfer arm D, the transfer module CPL3 of the shelf unit U1 and the transport arm A3. After a resist film is formed on the wafer W in the third block (COT layer) B3, the wafer W is transferred by the transport arm A3 to the transfer module BF3 of the shelf unit U1. In some cases an additional antireflective film is formed on the resist film in the fourth block (TCT layer) B4. In that case, the wafer W is transferred via a transfer module CPL4 to the transport arm A4, and transported by the transport arm A4 to the processing modules. After the formation of an antireflective film, the wafer W is transferred by the transport arm A4 to a transfer module TRS4.

In an upper area of the interior of the DEV layer B1 is provided a shuttle arm E as a transport means exclusively for transporting a wafer W from a transfer module CPL11, provided in the shelf unit U1, directly to a transfer module CPL12, provided in the shelf unit U2. The wafer W after the formation of the resist film or the additional antireflective film is transferred by the transfer arm D to the transfer module CPL11 via the transfer modules BF3, TRS4. The wafer W is then transported by the shuttle arm E directly to the transfer module CPL12 of the shelf unit U2, and carried into an interface block IB. In FIG. 3, the transfer modules with the symbol CPL each also function as a cooling module for temperature control, and the transfer modules with the symbol BF each also function as a buffer module capable of placing thereon a plurality of wafers W.

Next, the wafer W is transported by the interface arm F to an exposure apparatus EX, where the wafer W is subjected to predetermined exposure processing. Thereafter, the wafer W is transported by the interface arm F to the transfer module TRS6 of the shelf unit U2 and placed on it, and is then returned to the processing block PB. The wafer W is subjected to developing processing in the first block (DEV layer) B1. The wafer W after the processing is transported by the transport arm A1 to one of those transfer modules in the shelf unit U1 which are accessible by the transfer means C, and is then returned by the transfer means C to the carrier 20. The transport arms A1 to A4, the transfer means C, the transfer arm D and the interface arm F each correspond to a substrate transport device according to the present invention.

Figure 4:
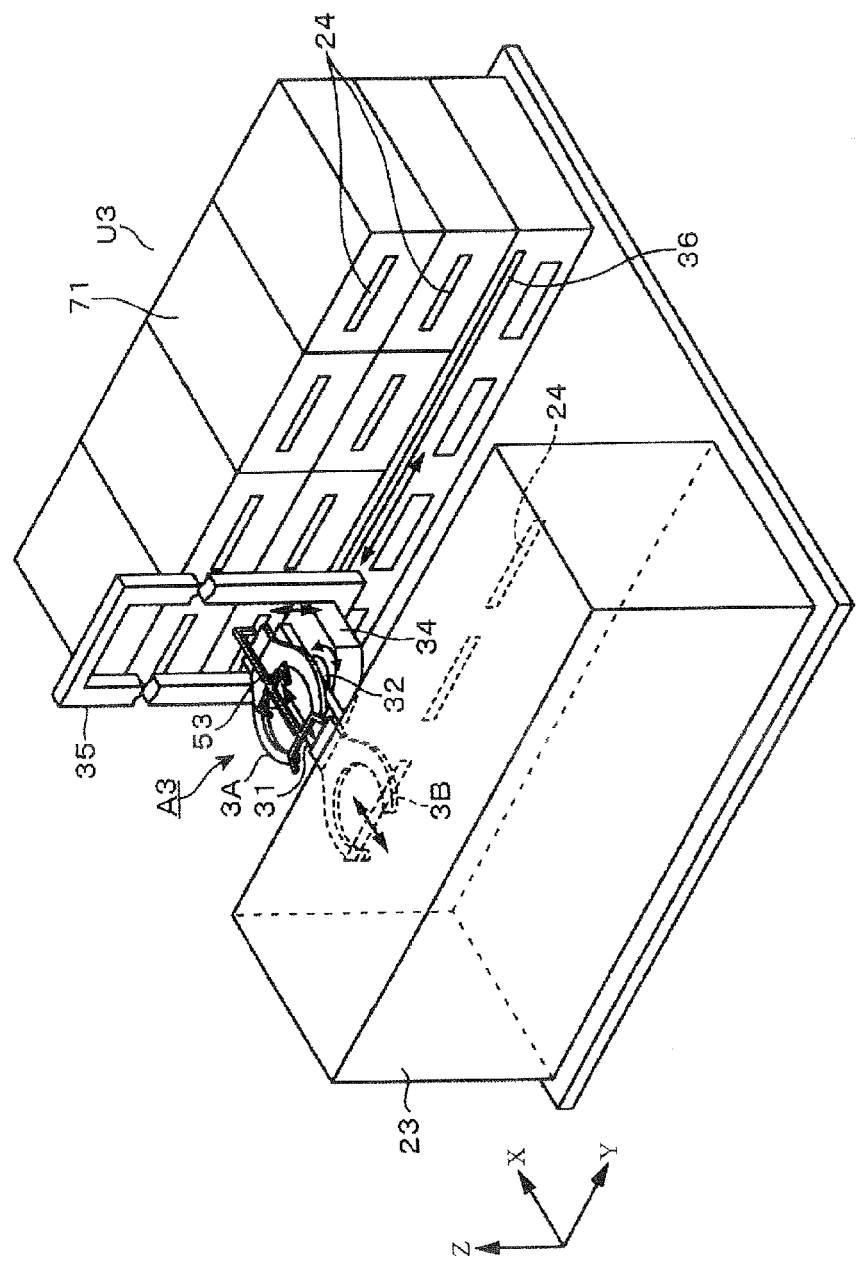
FIG. 4 is a schematic perspective view of a third block provided in the resist pattern forming apparatus.

FIG. 4 shows the third block (COT layer) B3. In FIGS. 1 and 4, U3 is a shelf unit comprised of a stack of modules including thermal modules, such as heating modules and cooling modules. The shelf unit U3 is disposed opposite a coating module 23, and the transport arm A3 is disposed between the coating module 23 and the shelf unit U3. In FIG. 4 reference numeral 24 denotes a transport opening for transferring a wafer W between each module and the transport arm A3.

The transport arms A1 to A4 will now be described. The transport arms A1 to A4 have the same construction, and therefore the following description is given of the transport arm A3, provided in the third block (COT layer) B3, as an example. As shown in FIGS. 4 to 8, the transport arm A3 includes a plurality of, for example two, forks 3 (3A, 3B) which each serve as a holding frame surrounding the periphery of a wafer W and which are configured to be movable back and force (movable in the X-axis direction in FIGS. 4 and 5) along a base 31. The base 31 is configured to be rotatable on a vertical axis by means of a rotating mechanism 32. The forks 3A, 3B are supported at their base ends by back-and-forth movement mechanisms 33A, 33B, respectively, which are each configured to move along the base 31 by means of a drive mechanism (not shown) using a timing belt, provided in the interior of the base 31. The forks 33A, 33B are thus configured to be movable between a wafer transfer position, where the back-and-forth movement mechanisms 33A, 33B are in a forward position on the front-end side of the base 31, and a standby position where the back-and-forth movement mechanisms 33A, 33B are in a backward position on the base-end side of the base 31.

A lifting stage 34 is provided under the rotating mechanism 32. The lifting stage 34 is configured to be vertically movable by means of a lifting mechanism as a drive section along a not-shown Z-axis guide rail extending linearly in the vertical direction (the Z-axis direction in FIGS. 4 and 5). A known construction, such as a ball screw mechanism or a mechanism using a timing belt, can be used as the lifting mechanism. The ball screw mechanism or the mechanism using a timing belt is configured to vertically move the lifting stage 34 through the rotation of a motor M.

In this embodiment the Z-axis guide rail and the lifting mechanism are each covered by a cover body 35, and the cover bodies 35 are connected and integrated e.g. at the top. As shown in FIG. 4, the cover body 35 is configured to slide along a Y-axis guide rail 36 extending linearly in the Y-axis direction.

Figure 9:
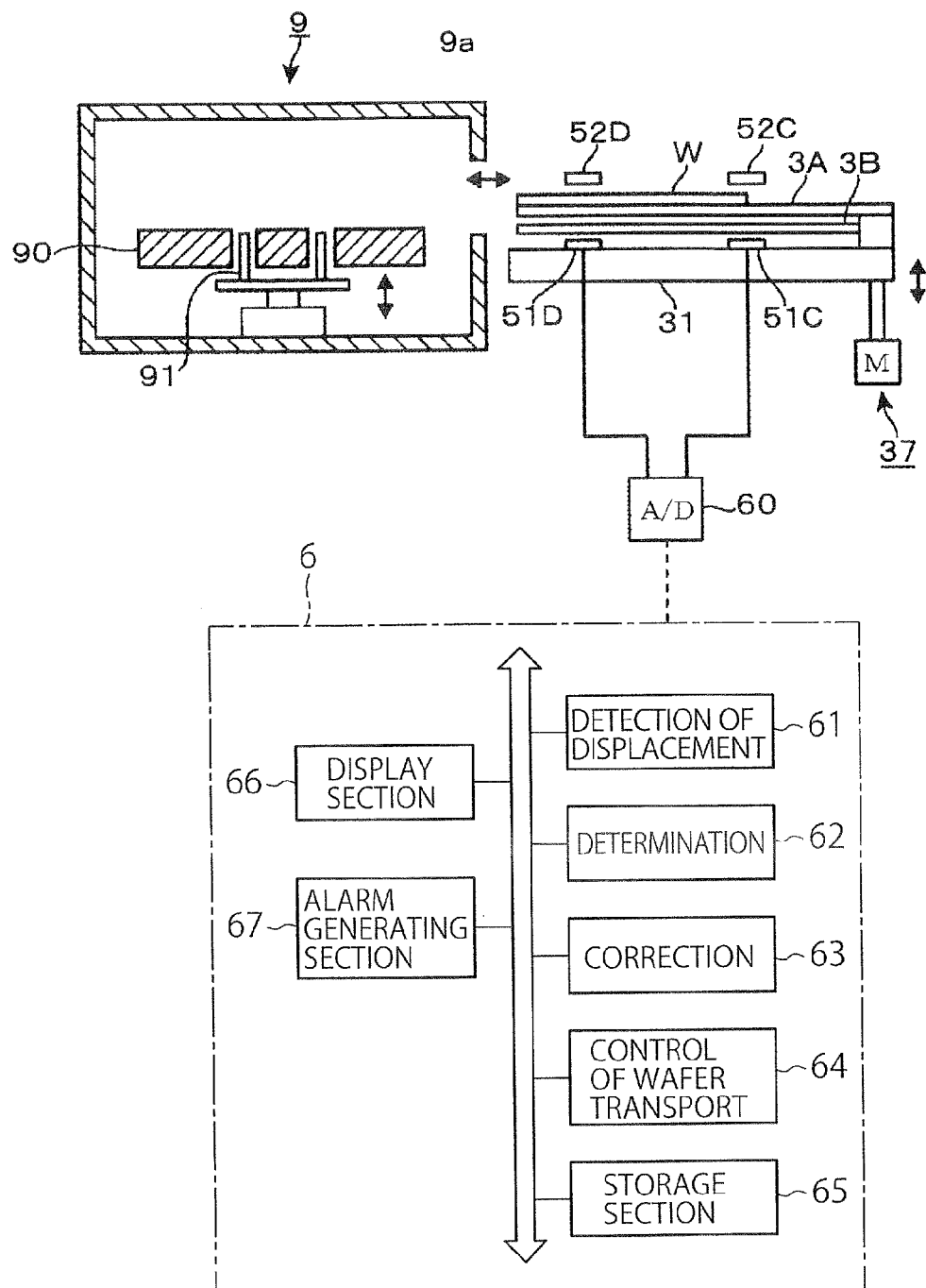
FIG. 9 is a diagram illustrating a control section provided in the resist pattern forming apparatus.

In the below-described FIG. 9, the lifting stage 34 is omitted and a lifting mechanism 37 is depicted under the base 31 for the convenience of illustration. The lifting mechanism 37 of this embodiment is configured to vertically move the base 31 along the Z-axis guide rail by rotating a not-shown lifting shaft, provided in the interior of the Z-axis guide rail, by means of a motor M.

Figure 5:
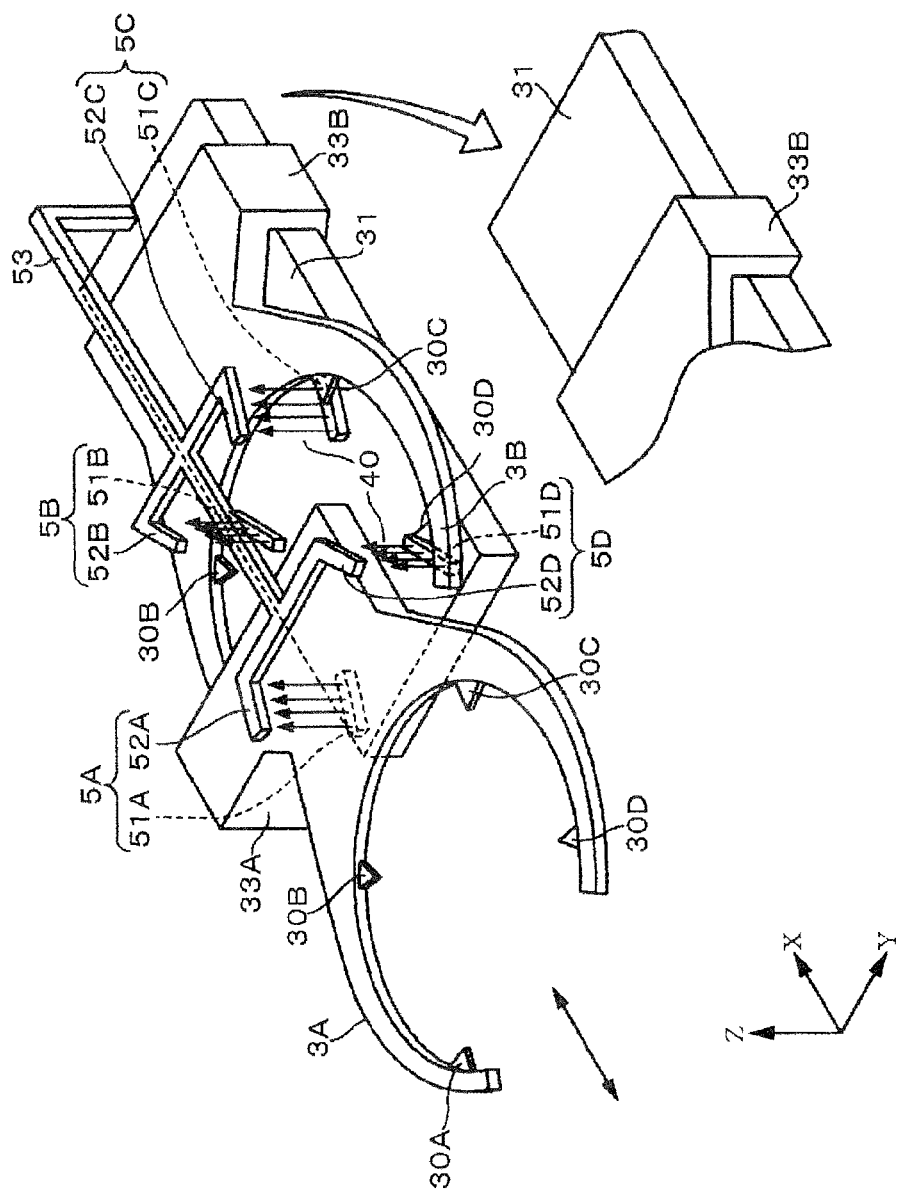
FIG. 5 is a perspective view of a transport arm provided in the third block.
Figure 6:
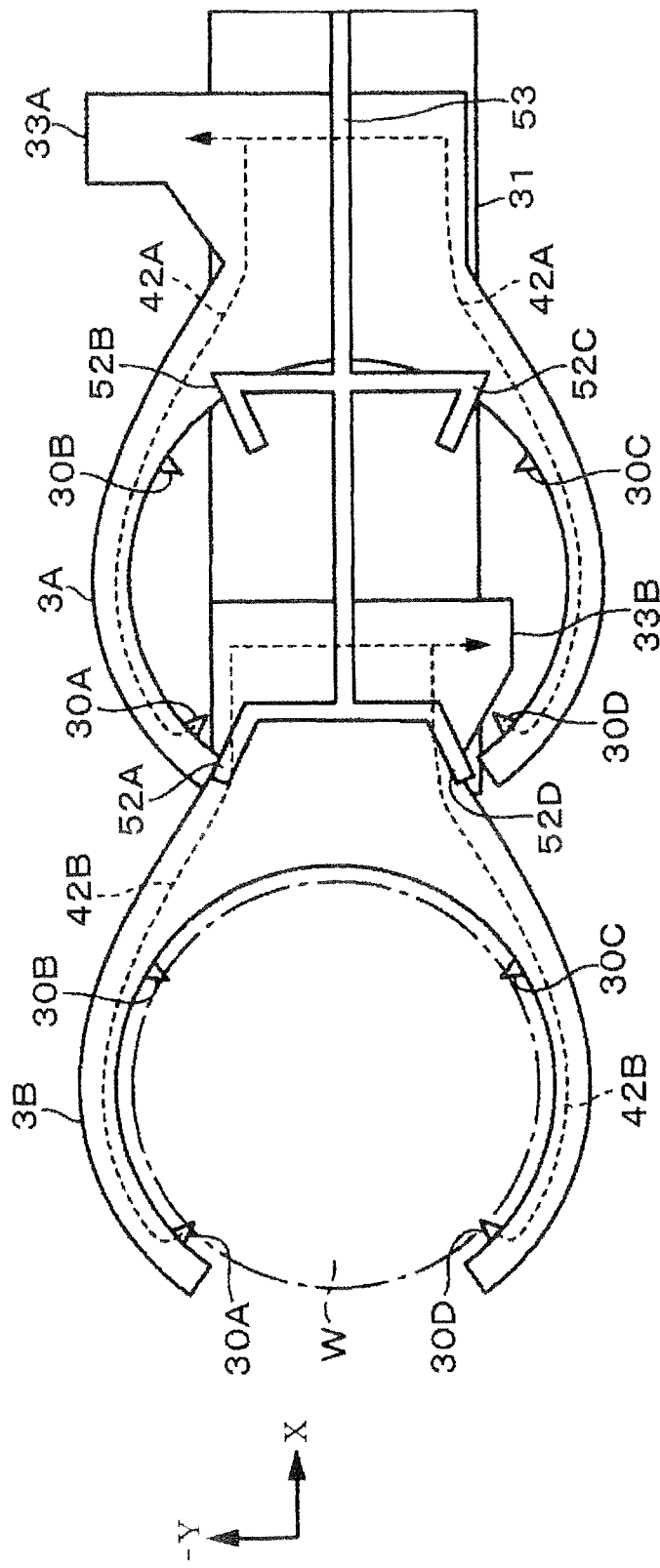
FIG. 6 is a plan view of the transport arm.
Figure 7:
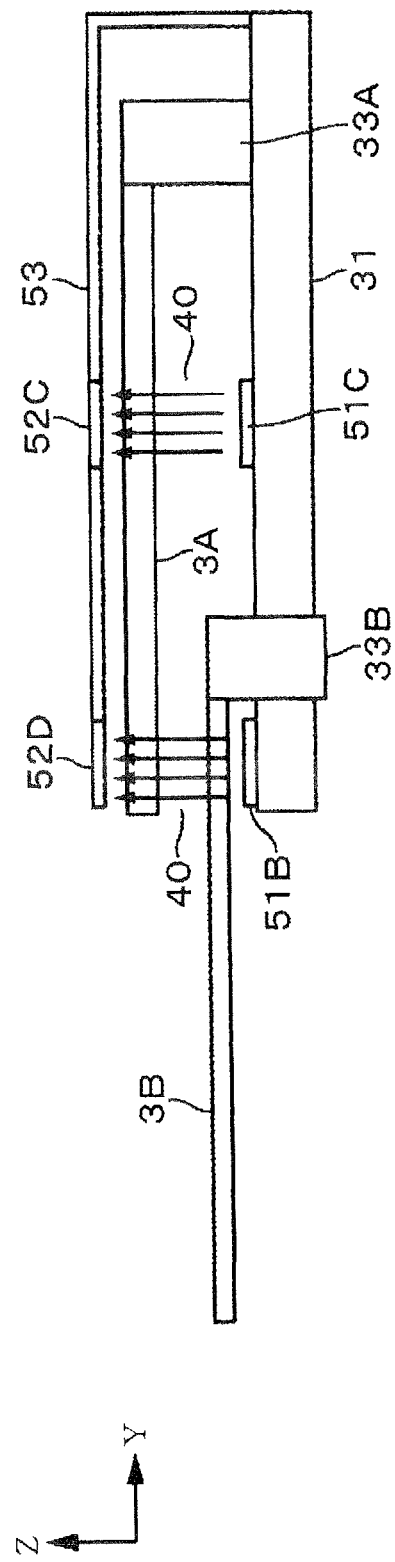
FIG. 7 is a side view of the transport arm.
Figure 8:
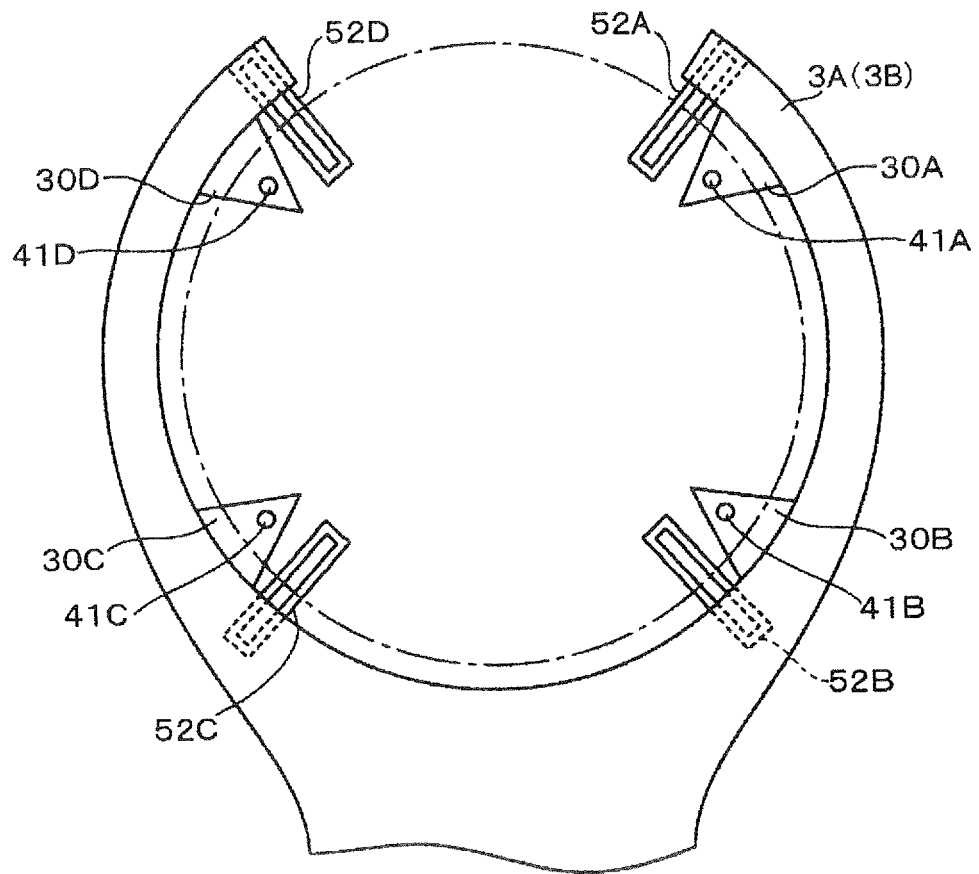
FIG. 8 is a plan view showing an example of a set of detection sections provided in the transport arm.

The forks 3A, 3B each have the shape of a circular arc and, as shown in FIGS. 5, 6 and 8, have at least three holding claws 30 as holding portions, projecting inwardly from the inner periphery of the fork 3A or 3B and arranged at a distance from each other for placing thereon peripheral portions of the back surface of a wafer W. In this embodiment the forks 3A, 3B each have four holding claws 30A, 30B, 30C, 30D to hold four peripheral potions of a wafer W.

The transport arm A3 of this embodiment is configured to attract a wafer W by vacuum suction: As shown in FIG. 8, the holding claws 30A to 30D have suction holes 41A to 41D, respectively. The suction holes 41A to 41D are connected to a not-shown vacuum source via vacuum piping 42A, 42B (see FIG. 6) provided e.g. in the interior, the upper surface or the lower surface of the fork 3A or 3B, so that the peripheral portions of the back surface of a wafer W are attracted to and held on the holding claws 30A to 30D.

The transport arm A3 is provided with a set of detection sections 5. The detection sections 5 are to optically detect the positions of at least three peripheral (contour) portions of a wafer W held by the fork 3A or 3B e.g. when it is in the standby position. In this embodiment the transport arm A3 has at least three detection sections 5, e.g. four detection sections 5A to 5D. The four detection sections 5A to 5D are arranged at a distance from each other along the periphery of a wafer W held by the fork 3A or 3B in the standby position.

The detection sections 5 (5A to 5D) consist of pairs of four light sources 51 (51A to 51D) and four light receivers 52 (52A to 52D). A linear array of LEDs, a linearly extending single LED, or the like can be used as each of the light sources 51 (51A to 51D). A linear image sensor comprised of linearly-arranged light receiving elements can be used as each of the light receivers 52 (52A to 52D). Various types of sensors, such as a CCD line sensor, a fiber line sensor, a photoelectric sensor, etc., can be used as the linear image sensor. The following description illustrates the use of a CCD line sensor by way of example.

The light sources 51 (51A to 51D) and the light receivers 52 (52A to 52D) are disposed such that a pair of a light source 51 and a light receiver 52 face each other on opposite sides of a peripheral portion of a wafer W in the standby position. Thus, either the light sources 51 (51A to 51D) or the light receivers 52 (52A to 52D) are disposed below the two forks 3A, 3B, while the others are disposed above the two forks 3A, 3B. In the example illustrated in FIGS. 5 through 7, the light sources 51 (51A to 51D) are mounted on the base 31, while the light receivers 52 (52A to 52D) are mounted on the base 31 via a support member 53.

As shown in FIGS. 5 and 8, the light receiving elements of each of the light receivers 52 (52A to 52D) are arranged linearly in the radial direction of a wafer W, while the light sources 51 (51A to 51D) are each designed be capable of applying light to the corresponding light receiver 52 over the entire length. Therefore, a light flux 40, corresponding to the arrangement area of the light receiving elements in each of the light receivers 52 (52A to 52D), is to be formed between the light sources 51 (51A to 51D) and the light receivers 52 (52A to 52D).

Further, the light sources 51 (51A to 51D) and the light receivers 52 (52A to 52D) are disposed such that the light flux 40 is not blocked when no wafer is on the fork 3A or 3B in the standby position, whereas when a wafer W is on the fork 3A or 3B in the standby position, the light flux 40 is blocked by a peripheral portion of the wafer W. The degree of blocking of the light flux 40 differs and thus the amount of light, entering a light receiver 52, varies depending on the position of the wafer W on the fork 3A or 3B. This enables detection of the positions of the peripheral portions of the wafer W. As described previously, e.g. 100 light receiving elements (CCDs) are lined up in the radial direction of the wafer W, and a voltage drop occurs to an extent proportional to the number of light receiving elements that have received light. The voltage drop value is sent to a control section 6 via the A/D (analog/digital converter) 60 shown in FIG. 9.

Figure 10:
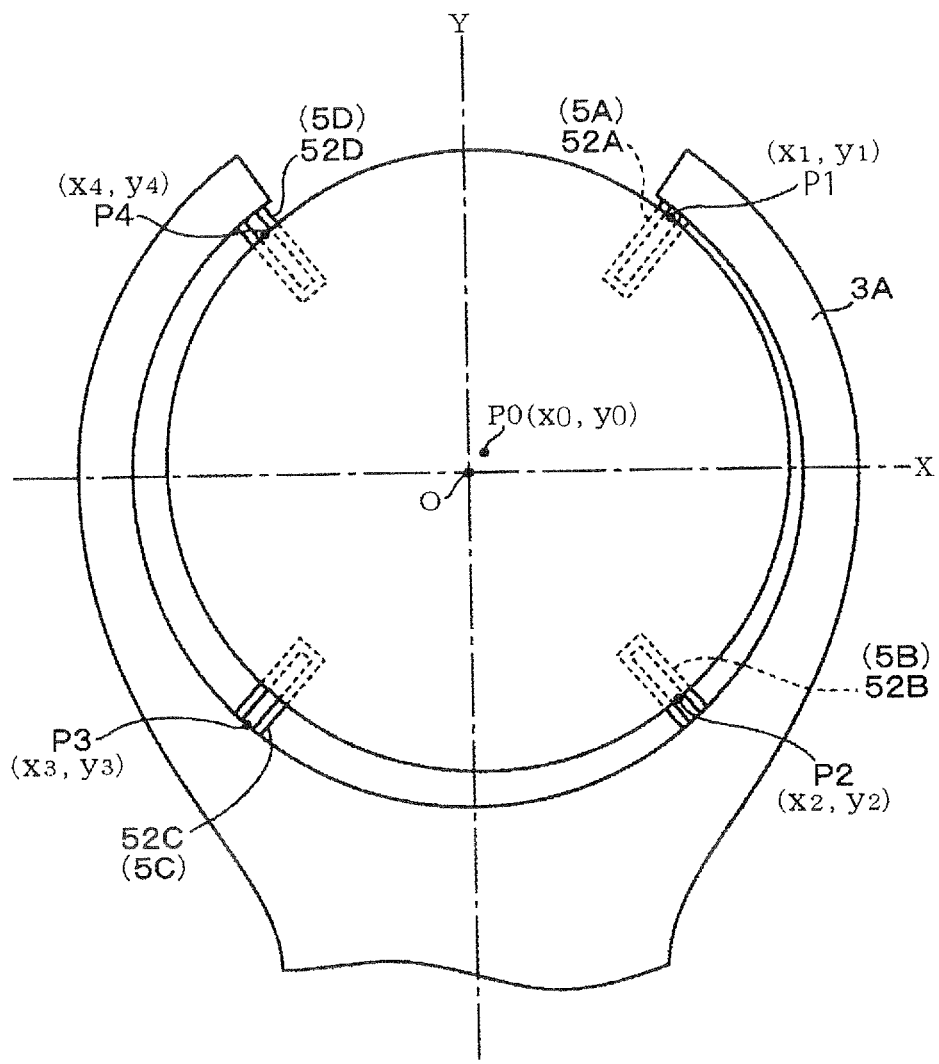
FIG. 10 is a plan view illustrating detection of the positions of peripheral portions of a wafer by means of the detection sections.

The position of each of four peripheral portions of a wafer W can thus be determined by determining the position of the boundary between those CCDs (pixels) which have received light and those CCDs (pixels) which have not received light. The forks 3A and 3B have the same construction, and therefore the following description is given of the fork 3A as an example. As shown in FIG. 10, an XY coordinate system is set with the center O of a wafer W as the origin when the wafer W is held in a reference position on the fork 3A. The "reference position" refers to e.g. a position where the center of a wafer W coincides with the center of the holding area of the fork 3A. The positions P1 to P4 of those four peripheral portions of the wafer W which correspond to the detection sections 5A to 5D can be determined as XY coordinates.

Figure 11:
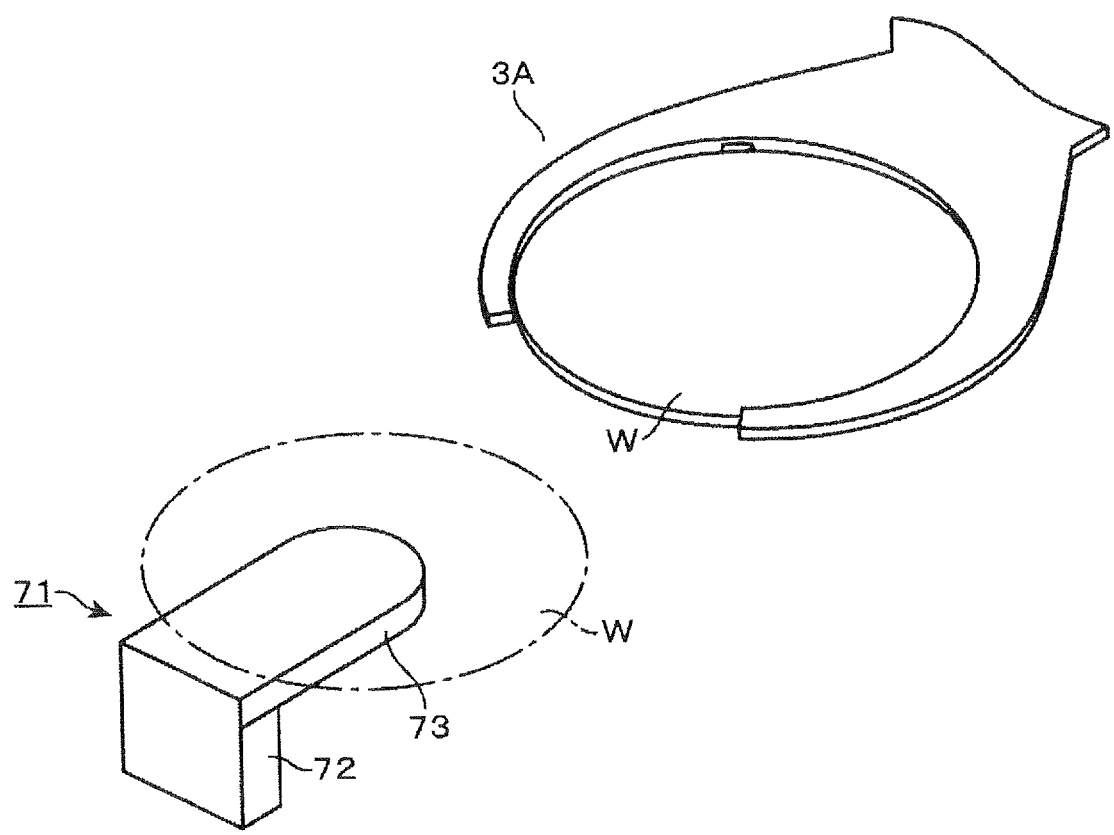
FIG. 11 is a perspective view showing an exemplary wafer stage module.

Referring again to the COT layer B3, a first wafer stage module 71 (hereinafter simply referred to as "wafer stage module 71") for temporarily placing a wafer W thereon is provided in the COT layer B3 at a position accessible by the transport arm A3, e.g. as one of the modules of the shelf unit U3. As shown in FIG. 11, the wafer stage module 71 consists of a support portion 72 and a stage portion 73, provided on the top of the support portion 72, for placing a wafer W thereon. The stage portion 73 has such a shape that a wafer W can be transferred to the stage portion 73 without collision of the fork 3A or the wafer W with the stage portion 73 even when the wafer W is held on the fork 3A in a position displaced from the reference position. The stage portion 73 is, for example, comprised of a plate-like body having an arc-shaped front end. The shape and size of the stage portion 73 are determined such that when a wafer W is transferred between the stage portion 73 and the fork 3A, the fork 3A surrounds the stage portion 73 with a certain space between them.

In this embodiment the above-described detection sections 5 are provided also in the transfer means C, the transfer arm D and the interface arm F. Further, second to fourth wafer stage modules 74 to 76 are provided for the transfer means C, the transfer arm D and the interface arm F, respectively.

Figure 12:
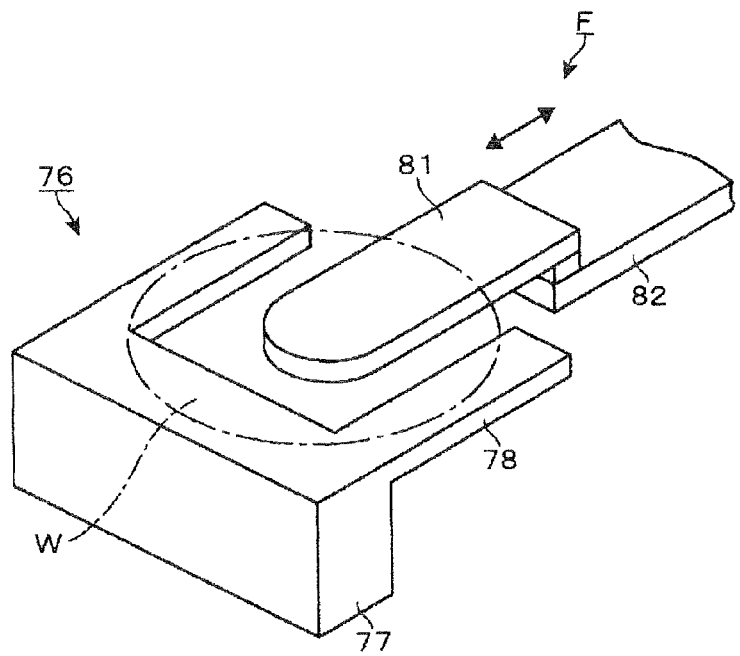
FIG. 12 is a perspective view showing another exemplary wafer stage module.

As shown in FIG. 12, the interface arm F includes a holding member 81 for holding a wafer W and which is configured to be movable back and along a base 82. The base 82 is configured to be vertically movable, rotatable on a vertical axis and movable in the X direction in FIG. 1. When the holding member 81 is in a backward standby position on the base-end side of the base 82, the positions of a plurality of, e.g. four, peripheral portions of a wafer W held on the holding member 81 can be measured with the detection sections 5A to 5D. The holding member 81 is, for example, comprised of a plate-like body which holds a central portion of the back surface of a wafer W. A depiction of the detection sections 5 is omitted in FIG. 12.

The transfer arm D includes a holding member 80a which is configured to be movable back and forth along a base 80b. The base 80b is configured to be vertically movable. The holding member 80a may have a shape similar to that of the holding member 81 of the interface arm F. The transfer means C has a similar construction to that of the interface arm F except that the holding member 83 has a different shape. For example, as shown in FIG. 1, the holding member 83 of the transfer means C is comprised of a fork-shaped plate-like body for holding a central portion of the back surface of a wafer W.

In this embodiment the second to fourth wafer stage modules 74 to 76 have the same construction. Taking the fourth wafer stage module 76 as a representative example, as shown in FIG. 12, the wafer stage module 76 consists of a support portion 77 and a stage portion 78, provided at the top of the support portion 77, for placing a wafer W thereon. The stage portion 78 has such a shape that a wafer W can be transferred to the stage portion 78 without collision of the holding member 81 of the interface arm F or the wafer W with the stage portion 78 even when the wafer W is held on the holding member 81 in a position displaced from the reference position. In this embodiment the stage portion 78 is comprised of a U-shaped plate-like body. The shape and size of the stage portion 78 are determined such that when a wafer W is transferred between the stage portion 78 and the holding member 81, the holding member 81 surrounds the stage portion 78 with a certain space between them.

The second wafer stage module 74 is provided at a position accessible by the transfer means C, e.g. in the shelf unit U1 (see FIG. 3). The third wafer stage module 75 is provided at a position accessible by the transfer arm D, e.g. in the shelf unit U1. The fourth wafer stage module 76 is provided at a position accessible by the interface arm F, e.g. in the shelf unit U2.

The control section 6 provided in the resist pattern forming apparatus will now be described with reference to FIG. 9. The control section 6 is, for example, comprised of a computer and includes a data processing section comprising a program, a memory and a CPU. The program contains instructions (steps) for causing the control section 6 to send control signals to components of the resist pattern forming apparatus so that the apparatus will perform resist pattern-forming processing and the below-described detection of the position of a wafer W. The program is stored in a computer storage medium, such as a flexible disk, a compact disk, a hard disk or an MO (magneto-optical disk) and installed on the control section 6.

The program includes a displacement detection program 61, a determination program 62, a correction program 63, a transport control program 64, etc. Further, the control section 6 includes a reference data storage section 65 so that control signals are sent also to a display section 66, an alarm generating section 67, and drive mechanisms for the transport arms A1 to A4, the transfer means C, the transfer arm D and the interface arm F. The following description is given of the fork 3A as a representative holding member.

The displacement detection program 61 serves as a calculating section and is configured to determine, based on the results of detection by the above-described detection sections 5, a displacement of a wafer W on the fork 3A from a reference position. In particular, the displacement detection program 61 is configured to calculate and obtain the center position of the wafer W based on data on the positions of four peripheral portions of the wafer W on the fork 3A, detected by the detection sections 5A to 5D, and calculate and determine the displacement of the obtained center position from a reference center position. The "obtained center position" refers to the center position of a wafer W, determined by calculation based on the results of detection of the position of the wafer W, whereas the "reference center position" refers to the center position of a wafer W when the wafer W is in the reference position on the fork 3A.

As shown in FIG. 10, the detection sections 5 detect the positions P1 to P4 of four peripheral portions of the wafer W as coordinates (x1, y1), (x2, y2), (x3, y3), (x4, y4). The coordinates (x0, y0) of the position of the center P0 of the wafer W (see FIG. 10) can be calculated from the data on the four positions. When one of the four positions P1 to P4 coincides with a notch provided in the wafer W, the coordinates (x0, y0) of the position of the center P0 of the wafer W is determined from the data on the other three positions.

As described above, the coordinates of the reference center position is the origin (0, 0). Accordingly, the displacement of the obtained center position from the reference center position corresponds to the coordinates (x0, y0). The displacement can thus be determined by the X-direction and Y-direction components of the displacement.

The determination program 62 is a program for determining whether to transport a wafer W to the next module or to transport the wafer W to the wafer stage module 71 by comparing a detected displacement value obtained in the displacement detection program 61 with an acceptable range of displacement, set for each module, as described below.

The transport arm A3 is configured to transfer a wafer W, held in the reference position on the fork 3A, to a reference position in a module. The "reference position in a module" herein refers to a reference position of the wafer holding area of the module, e.g. a position where the center of a wafer W coincides with the center of the wafer holding area. Thus, a wafer W, held on the fork 3A such that the center of the fork 3A coincides with the center of the wafer W, is transferred from the fork 3A to the wafer holding area of a module such that the center of the wafer holding area coincides with the center of the wafer W. When a wafer W is held on the fork 3A in a position displaced from the reference position, the wafer transfer position of the transport arm A3 is corrected in such a manner as to reduce the displacement on transfer of the wafer W to a module. The expression "reduce the displacement" herein includes, besides the case of transferring a wafer W to a reference position in a module, the case of transferring a wafer W to a position close to the reference position.

Figure 13:
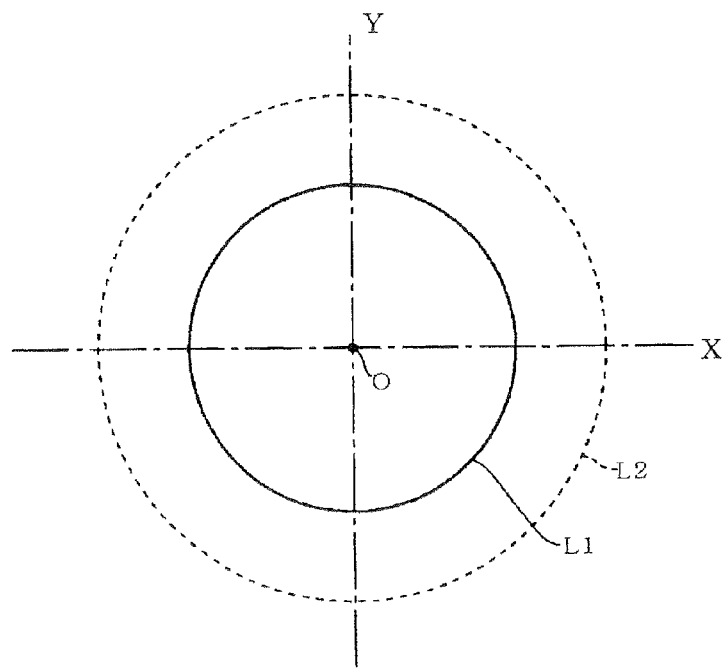
FIG. 13 is a plan view illustrating an acceptable range of displacement and a detectable range.

Referring to FIG. 13, the intersection O of the X axis with the Y axis represents the center of a wafer W in the reference position on the fork 3A, and the range L1 shown by the solid line represents an acceptable range of displacement, set for each module. The acceptable range indicates such a range that if the center of the wafer W is within the range, the wafer W can be transferred to a module without collision of the fork 3A with the wafer holding area of the module. The range L2 shown by the dotted line represents a range detectable by the detection sections 5: if the center of the wafer W is within the range, the peripheral portions of the wafer W can be detected by the detection sections 5.

Figure 14:
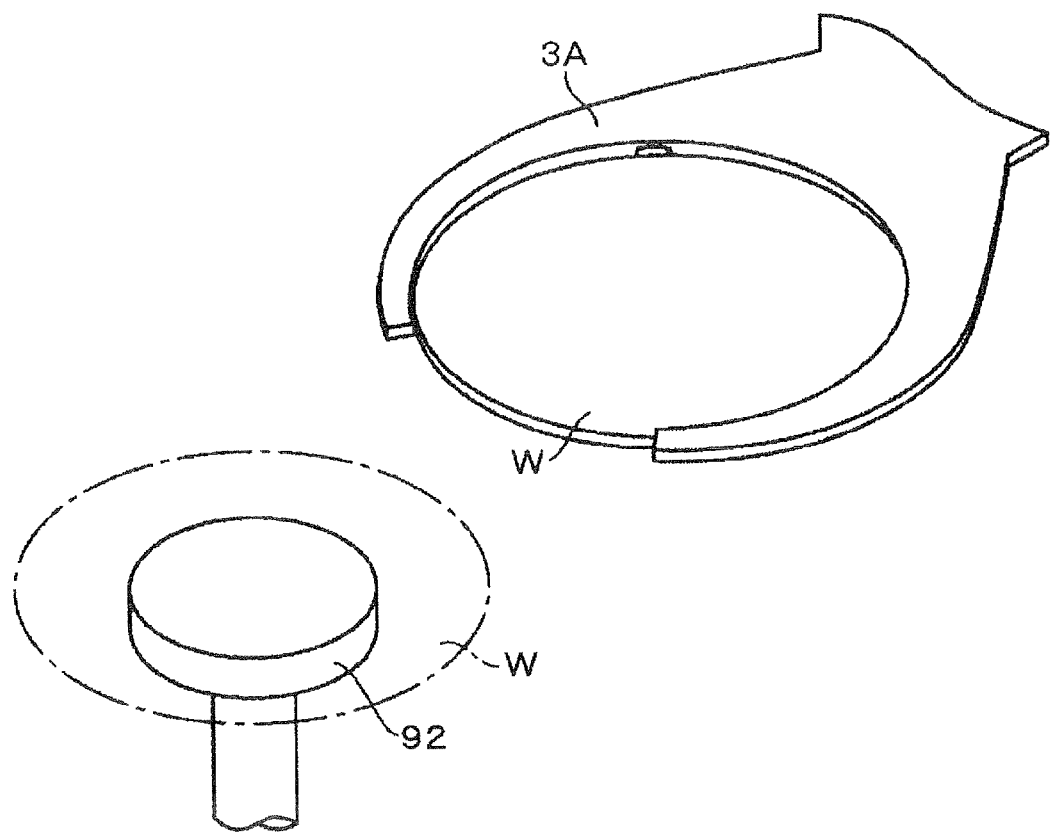
FIG. 14 is a perspective view showing yet another exemplary wafer stage module.

As described above, the acceptable range is set for each module. Taking the transport arm A3 as an example, the wafer holding area of a module, on which a wafer W is held upon transfer of the wafer W between the module and the transport arm A3, includes a projecting pin mechanism 91 for a heating plate 90 provided in a heating module 9 for preforming heat treatment of a wafer W (see FIG. 9), a spin chuck 92 provided in a liquid processing module (see FIG. 14), a cooling plate provided in a temperature control module 93 for controlling the temperature of a wafer W (see FIGS. 15 and 16), etc.

The heating module 9 and the temperature control module 93 will now be described briefly. As shown in FIG. 9, the heating module 9 includes a heating plate 90, disposed in a processing container 9a, for placing thereon and heating a wafer W. The heating plate 90 is provided with the projecting pin mechanism 91 which, upon transfer of a wafer W between the heating plate 90 and the transport arm A3, projects from the heating plate 90 and holds the back surface of the wafer W e.g. at three positions.

Figure 15:
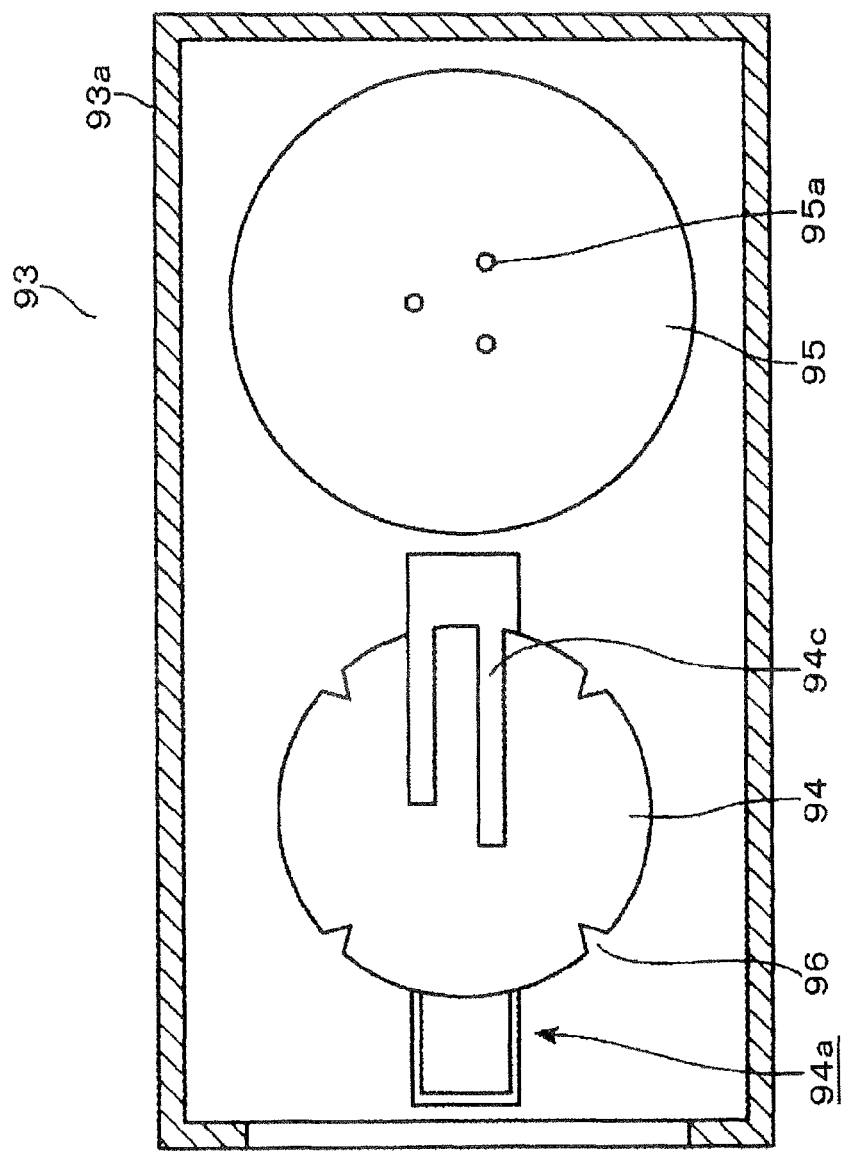
FIG. 15 is a plan view of an exemplary temperature control module.
Figure 16:
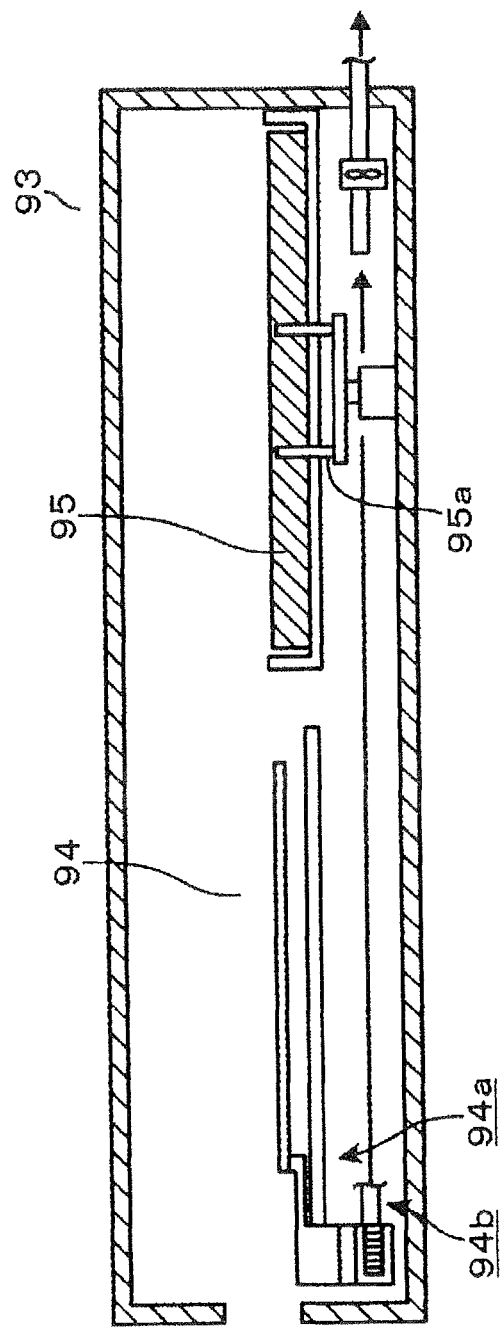
FIG. 16 is a sectional side view of the temperature control module.

As shown in FIGS. 15 and 16, the temperature control module 93 includes a cooling plate 94 and a heating plate 95, disposed in a processing container 93a. The cooling plate 94 is configured to be movable between a position where a wafer W is transferred between it and the transport arm A3 and a position where the wafer W is transferred between it and the heating plate 95 by means of a back-and-forth movement mechanism 94a. In FIG. 16, 94b denotes a fan mechanism for avoiding a rise in the temperature of the cooling plate 94. The heating plate 95 is provided with a projecting pin mechanism 95a for transferring a wafer W between the heating plate 95 and the cooling plate 94, while cutout portions 94c are formed in the cooling plate 94 at positions corresponding to the projecting pins. Further, notches 96 are formed in the periphery of the cooling plate 94 at positions corresponding to the holding claws 30A to 30D of the transport arm A3. Thus, in the temperature control module 93, a wafer W is transferred from the transport arm A3 to the cooling plate 94, and the wafer W is transferred from the cooling plate 94 to the heating plate 95. The wafer W which has been heated by the heating plate 95 is transferred via the cooling plate 94 to the transport arm A3.

The projecting pin mechanism 91 and the spin chuck 92 have a large clearance for the fork 3A on transfer of a wafer W. Therefore, collision of the fork 3A with the heating plate 90, etc. can be prevented even when the displacement of the wafer W is large and a large correction is made for the wafer transfer position of the transport arm A3. Thus, a wide acceptable range is set for the displacement.

Figure 17:
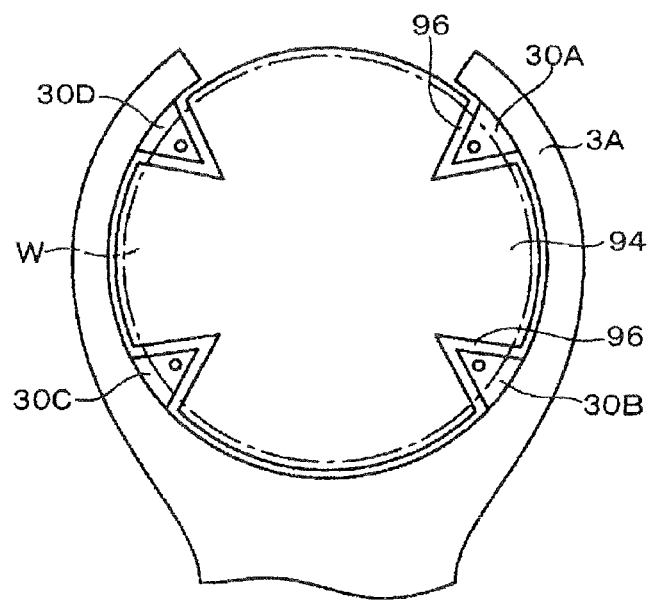
FIG. 17 is a plan view showing the cooling plate of the temperature control module and the transport arm.
Figure 18:
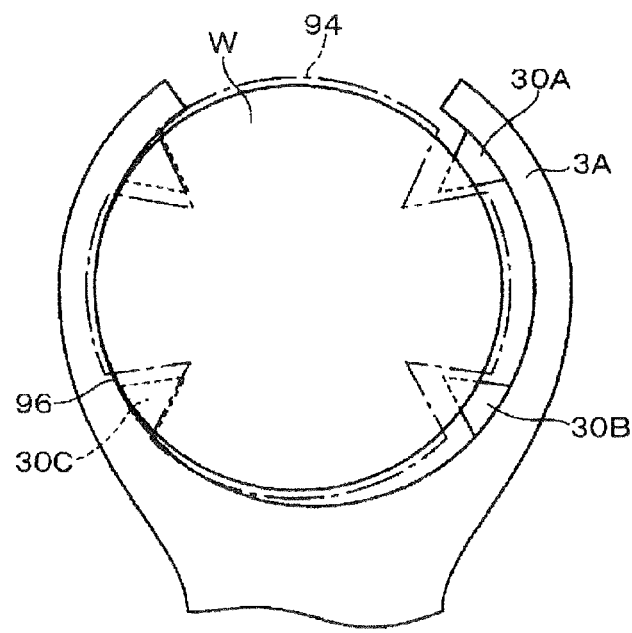
FIG. 18 is a plan view showing the cooling plate of the temperature control module and the transport arm.

On the other hand, as shown in FIG. 17, the cooling plate 94 (the cutout portions 94c not shown) of the temperature control module 93 is configured to hold a wafer W with the holding claws 30A to 30D of the fork 3A lying in the notches 96. When the wafer W is in the reference position on the fork 3A, the wafer W can be transferred to the reference position on the cooling plate 94 as shown in FIG. 17. When the displacement of the wafer W is large and a large correction is made for the wafer transfer position of the fork 3A, some of the holding claws 30A to 30D cannot enter the notches 96 and the fork 3A collides with the cooling plate 94 upon transfer of the wafer W as shown in FIG. 18. Therefore, the acceptable range of displacement should necessarily be narrow. FIG. 18 shows the cooling plate 94 in the dashed-dotted line and illustrates collision of the holding claw 30C with the notch 96. Because the acceptable range of displacement thus differs among modules, the acceptable range of the displacement of the center P0 of a wafer W from the reference center position is determined for each module.

The determination program 62 has a function to determine, based on a detected displacement value, whether to transport a wafer W to the next module, transport the wafer W to the wafer stage module 71 or output an alarm. In this embodiment the determination program 62 determines to output an alarm when the displacement is out of the range L2 shown in FIG. 13, i.e. a peripheral position of a wafer W cannot be detected by the detection sections 5. As described above, the detection sections 5 detect the position of the boundary between those CCDs which have received light and those CCDs which have not received light in each light receiver 52. The displacement of a wafer W is determined to be out of the range L2 when, for example, the position of the boundary cannot be detected by at least one of the four detection sections 5A to 5D.

When a displacement is obtained by the displacement detection program 61 based on the results of detection by the detection sections 5A to 5D, and if the detected displacement is within the acceptable range for the next module, the determination program 62 determines to transport the wafer W to the next module. On the other hand, if the detected displacement is out of the acceptable range for the next module, then the determination program 62 determines not to transport the wafer W to the next module but to transport the wafer W to the wafer stage module 71. The determination may be made at an appropriate time during the period after the fork 3A has received a wafer W from a module and the positions of peripheral portions of the wafer W are detected until transport of the wafer W to the next module is started. Alternatively, the determination may be made after the transport arm A3 has started to move toward the next module after the completion of detection of the peripheral positions of the wafer W on the fork A3 in the standby position.

The correction program 63 has a function to correct the wafer transfer position of the transport arm A3 in such a manner as to reduce the displacement of a wafer W on transfer of the wafer W to the next module.

Taking (0, 0) as the coordinates of the center of the holding area of the next module and (x0, y0) as the detected coordinates of the center of a wafer W, the wafer transfer position of the transport arm A3 is corrected by shifting the wafer transfer position by the distance "−x0" in the X direction and the distance "−y0" in the Y direction. By making the correction, the wafer W on the fork 3A can be transferred to the reference position of the wafer holding area of the next module.

The correction program 63 also has a function to correct the wafer transfer position of the transport arm A3 so that a detected displacement value falls within the acceptable range when the fork 3A has received a wafer W from the wafer stage module 71. There is a limit to the X-direction and Y-direction shifting distances by which the wafer transfer position of the transport arm A3 can be corrected. If the detected displacement of a wafer W exceeds the limit value, the correction can be made at most by the limit value.

The reference data storage section 65 stores data on the acceptable range of displacement, set for each module, in relation to the next module. The display section 66 is comprised of, for example, a computer display screen and is configured to be capable of performing selection of predetermined substrate processing, input of process parameters, etc. The alarm generating section 67 has a function to light a lamp, generate an alarm sound and/or display an alarm on the display section 66 upon generation of an alarm.

The transport control program 64 is a means to control the transport arms A1 to A4, the transfer means C, the transfer arm D, the interface arm F, etc. so that wafers W are sequentially transported from one module (preceding module) to another (next module) according to a predetermined order of wafer transport between modules, and has a function to control the actuation of the transport arms A1 to A4, etc. so that a wafer W is transported to a module as determined by the determination program 62. The transport control program 64 also has a function to control the transport arms A1 to A4 so that they move at a lower operating speed when transporting a wafer W to the wafer stage module 71 than when transporting the wafer W to the next module. The "operating speed" herein refers to the speed of operation of e.g. the transfer arm A3, such as the backward or forward movement of the fork 3A or 3B or the movement of the transport arm A3.

The control section 6 is thus configured to compare a detected displacement value with the acceptable range of displacement and, when the detected displacement value is within the acceptable range, output a control signal to cause the transport arm A3 to transport the wafer W to the next module, or when the detected displacement value is out of the acceptable range, output a control signal to cause the transport arm A3 to transfer the wafer W to the wafer stage module 71, and then receive the wafer W from the module 71 so that a detected displacement value comes to fall within the acceptable range. The expression "cause the transport arm A3 to transfer the wafer W to the wafer stage module 71, and then receive the wafer W from the module 71 so that a detected displacement value comes to fall within the acceptable range" herein includes the case where the wafer W is transferred once to the wafer stage module 71, whereby a detected displacement value comes to fall within the acceptable range, and the case where the wafer W is transferred to the wafer stage module 71 multiple times, whereby a detected displacement value comes to fall within the acceptable range.

The operation of the present invention will now be described with reference to an exemplary case where a wafer is transported from a heating module as a preceding module to a temperature control module 93 as the next module. As described above, the heating module and the temperature control module 93 are incorporated in the shelf unit U3 in each of the first block (DEV layer) B1, the second block (BCT layer) B2, the third block (COT layer) B3 and the fourth block (TCT layer) B4.

Figure 19:
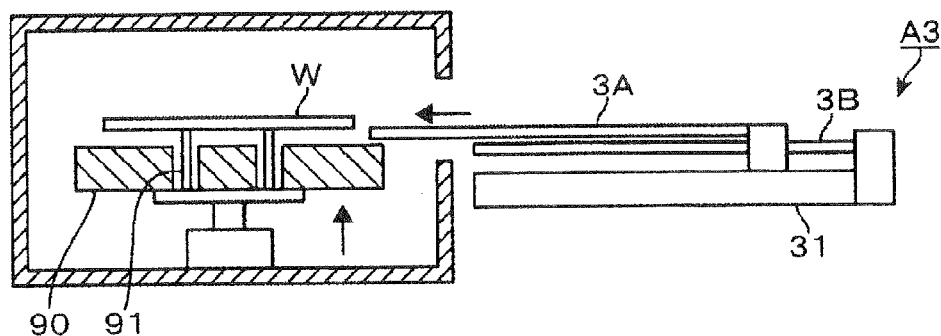
FIG. 19 is a sectional side view illustrating the action of the resist pattern forming apparatus.
Figure 20:
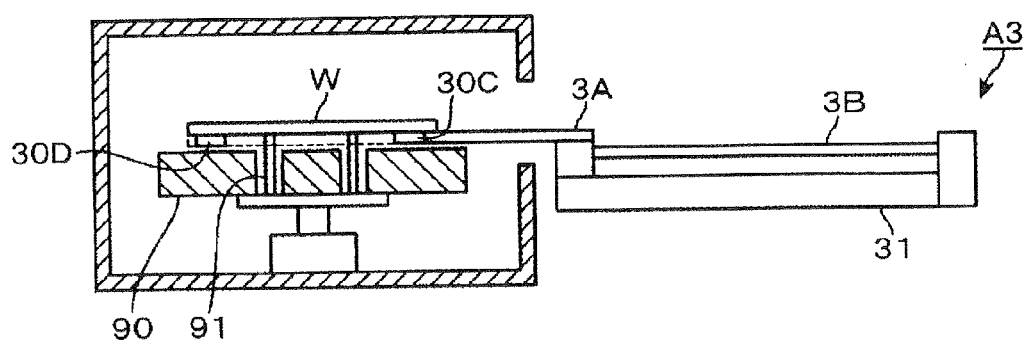
FIG. 20 is a sectional side view illustrating the action of the resist pattern forming apparatus.
Figure 21:
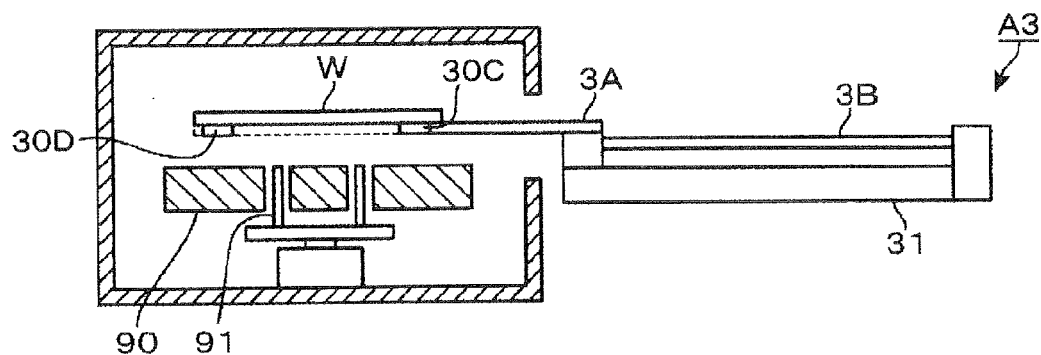
FIG. 21 is a sectional side view illustrating the action of the resist pattern forming apparatus.

In the heating module, as shown in FIG. 19, a wafer W is pushed up by means of the projecting pin mechanism 91 to raise the wafer W to a position above the heating plate 90. Next, as shown in FIG. 20, the fork 3A is moved forward to a position under the wafer W, and then the fork 3A is raised so as to hold the wafer W on the holding claws 30A to 30D. The fork 3A is further raised to a position above the projecting pin mechanism 91, whereby the fork 3A receives the wafer W from the projecting pin mechanism 91 as shown in FIG. 21. The wafer W is attracted to and held by the holding claws 30A to 30D. Thereafter, the fork 3A is moved backward.

Figure 22:
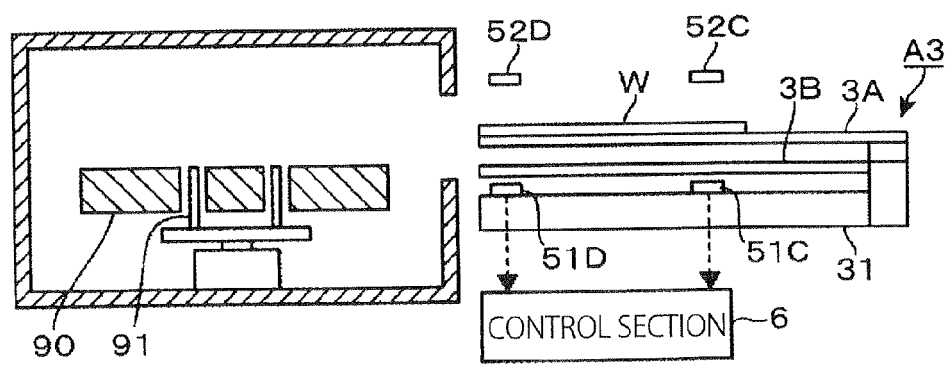
FIG. 22 is a sectional side view illustrating the action of the resist pattern forming apparatus.
Figure 23:
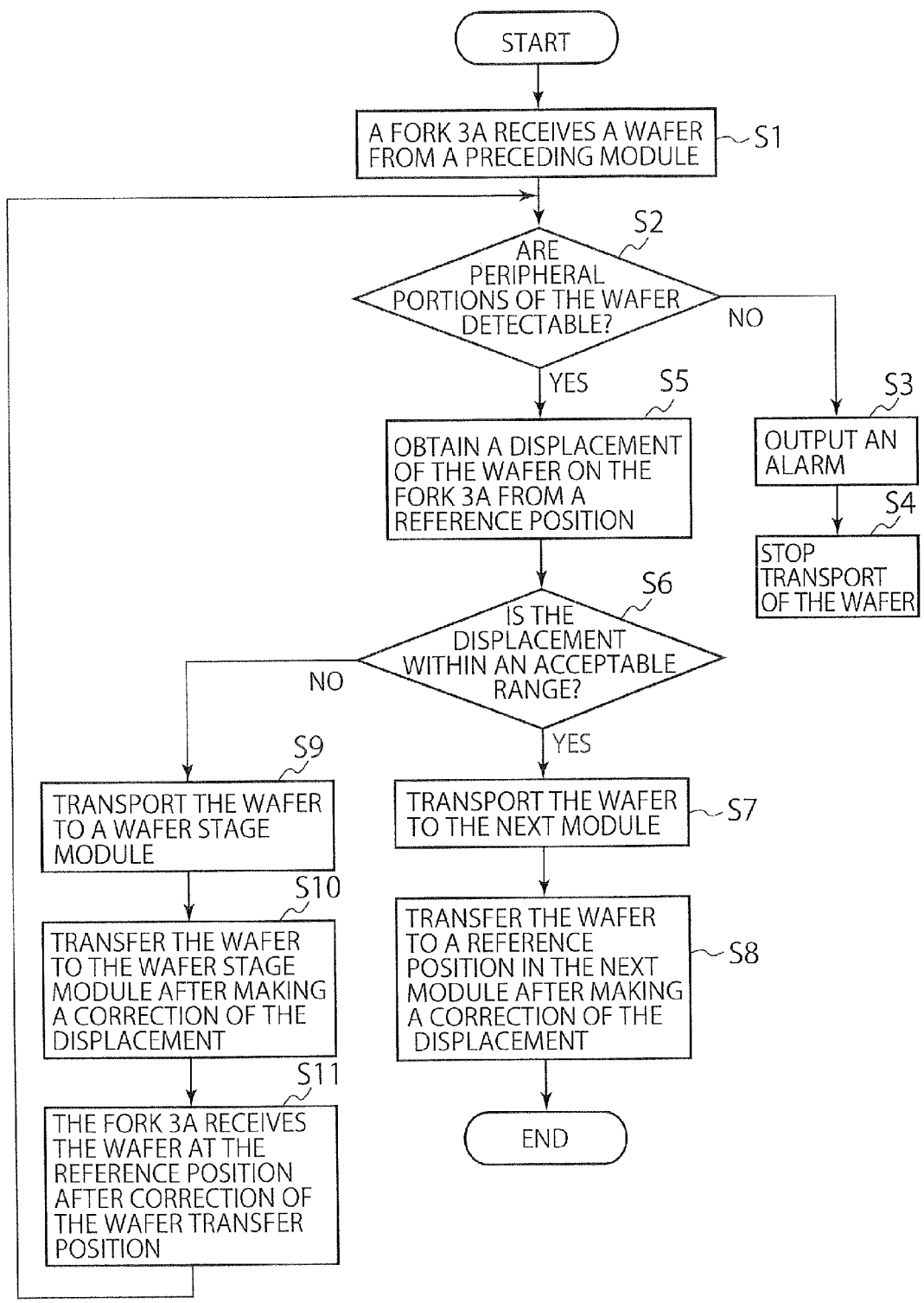
FIG. 23 is a flow chart illustrating the action of the resist pattern forming apparatus.

As shown in FIG. 22, when the fork 3A has moved to the standby position, data on the positions of peripheral portions of the wafer W is obtained by means of the detection sections 5A to 5D in the above-described manner, and a determination is made to as to whether to transport the wafer W to the next module, i.e. the temperature control module 93, or to transport the wafer W to the wafer stage module 71. In particular, after the fork 3A has received the wafer W from the preceding module (heating module) (step S1 in FIG. 23), a determination is made as to whether the peripheral portions of the wafer W are detectable by the detection sections 5A to 5D (step S2). If the displacement of the wafer W is out of the above-described range L2, the peripheral positions of the wafer W are determined to be undetectable and an alarm is outputted (step S3). Transport of the wafer W may be stopped (step S4).

If the displacement of the wafer W is within the above-described range L2, the peripheral positions of the wafer W are determined to be detectable. Based on the positional data obtained, the coordinates (x0, y0) of the center of the wafer W is determined by calculation as described above, thus obtaining detected values of displacements in the X and Y directions with respect to the reference position (step S5).

Figure 24:
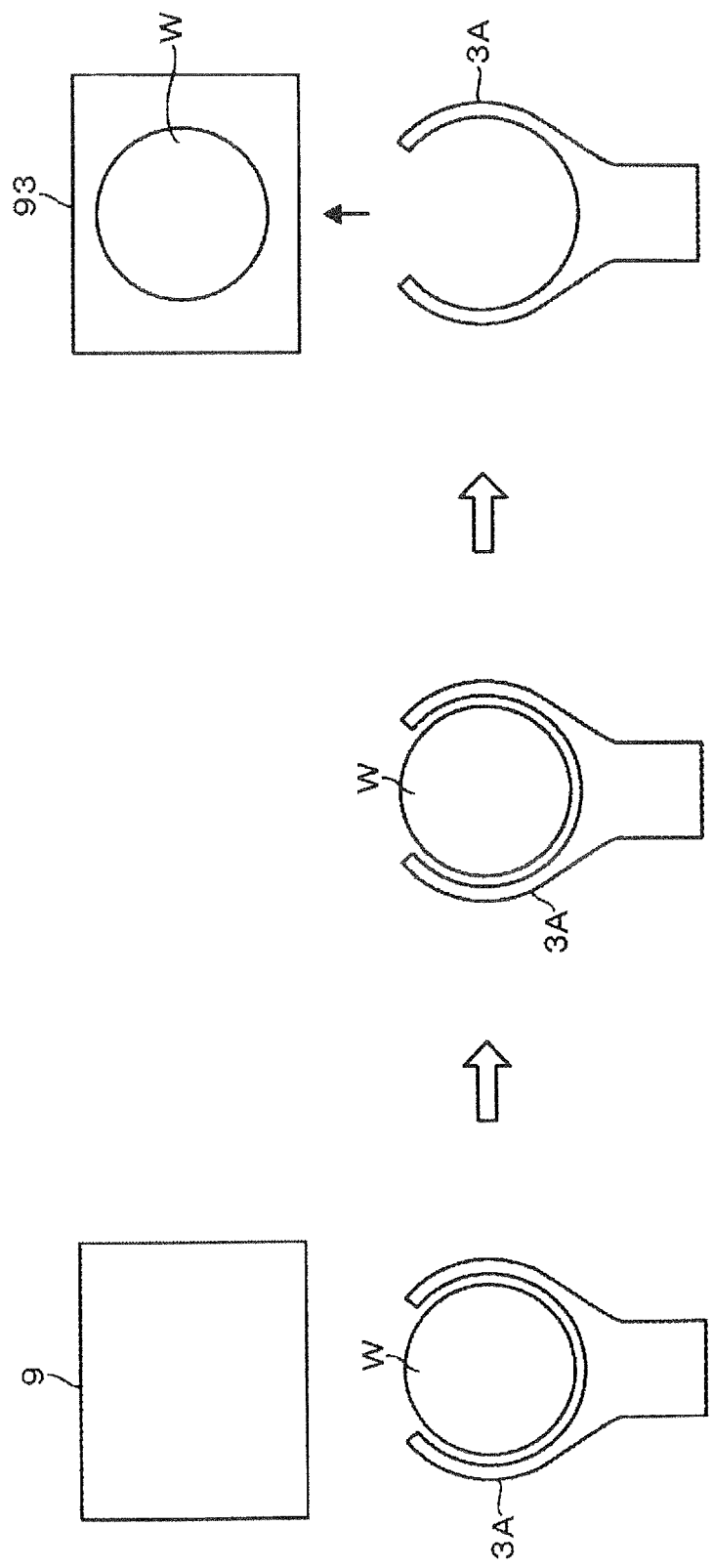
FIG. 24 is a process chart illustrating the action of the resist pattern forming apparatus.

Next, the acceptable range of displacement for the next module (temperature control module 93) is retrieved, and a determination is made as to whether the detected displacement is within the acceptable range (step S6). If the displacement is within the acceptable range, the wafer W is determined to be transported to the next module, and is transported to the next module as shown in FIG. 24 (step S7). As described above, the wafer transfer position of the transport arm A3 is corrected in the X and Y directions, so that the wafer W is transferred to the reference position in the next module (step S8). The attraction of the wafer W to the holding claws 30A to 30D is released immediately before transferring the wafer W to the holding area of the next module.

Figure 25:
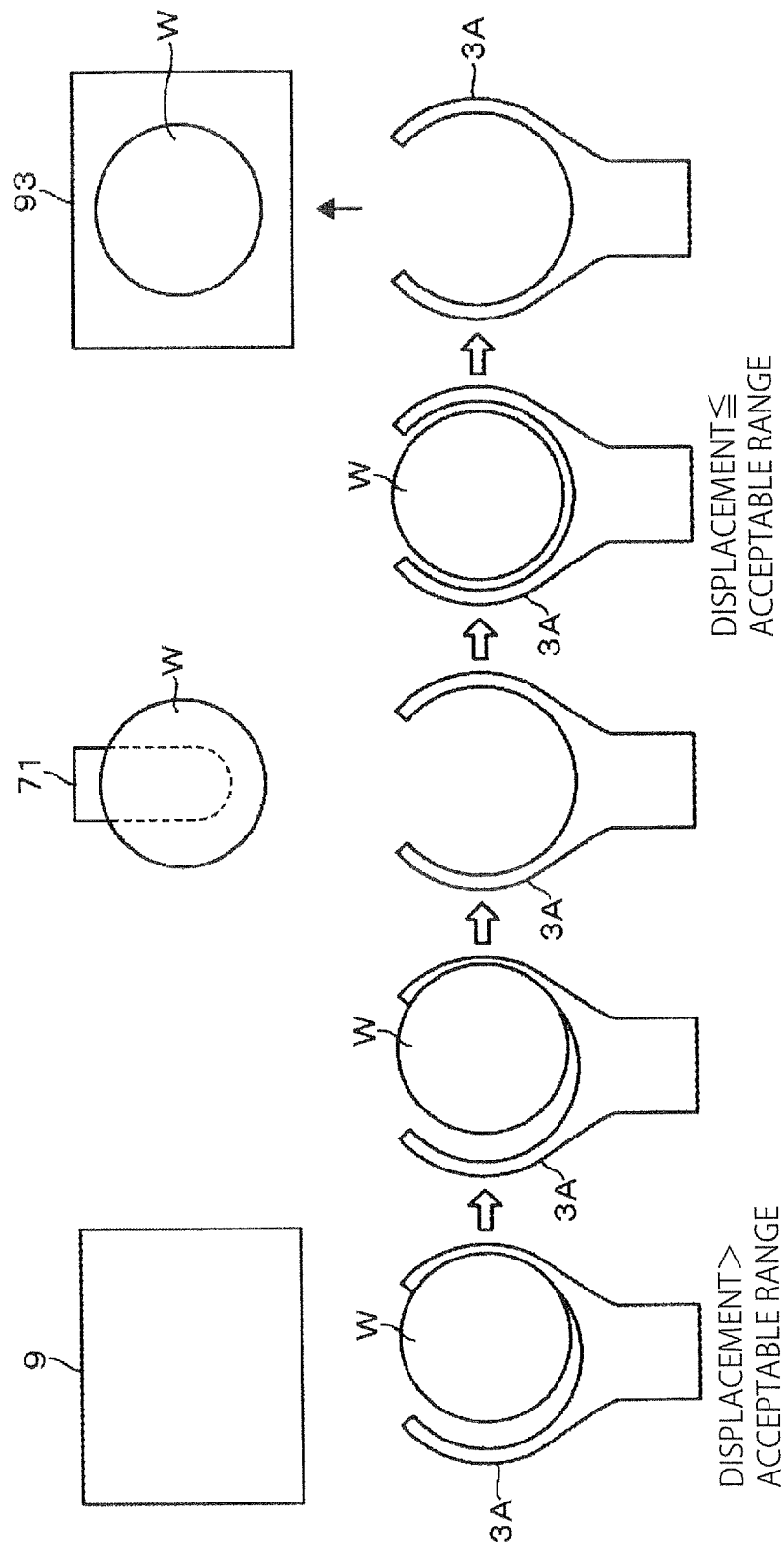
FIG. 25 is a process chart illustrating the action of the resist pattern forming apparatus.
Figure 26:
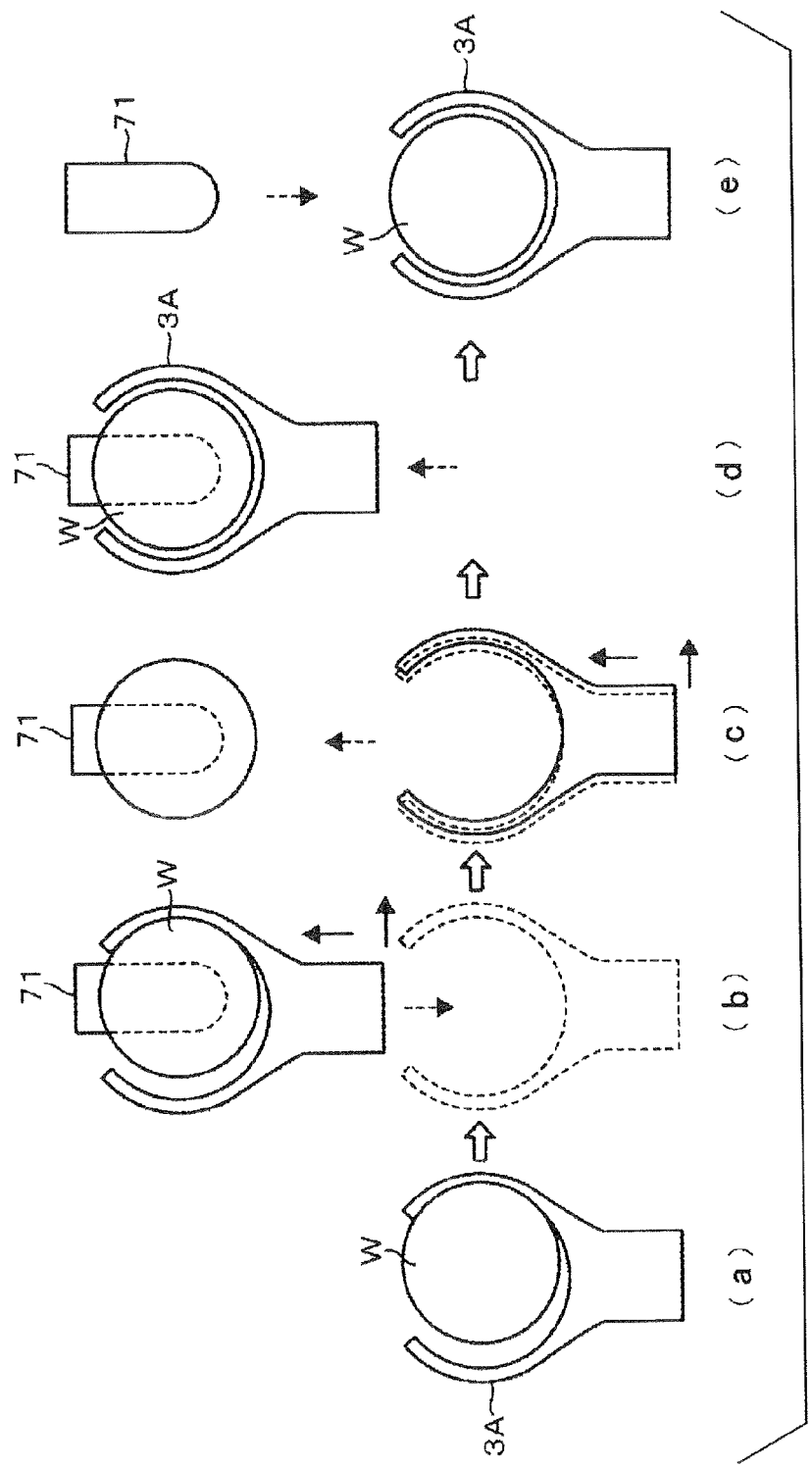
FIG. 26 is a process chart illustrating the action of the resist pattern forming apparatus.

If the displacement is out of the acceptable range, the wafer W is determined to be transported to the wafer stage module 71, and is transported to the wafer stage module 71 as shown in FIG. 25 (step S9). The operating speed of the transport arm A3 during transport of the wafer W to the wafer stage module 71 is made lower than that during transport of the wafer W to the next module. The wafer transfer position of the fork 3A is corrected in the X and Y directions before transferring the wafer W to the wafer stage module 71 so that the wafer W will be transferred to the reference position in the wafer stage module 71, i.e. the center of the wafer W will coincide with the center of the wafer holding area (stage portion 73) of the wafer stage module 71, as shown in FIG. 26(*b*) (step S10).

Next, the fork 3A receives the wafer W from the wafer stage module 71. As shown in FIG. 26(*c*), the wafer transfer position of the form 3A is corrected in the X and Y directions before the fork 3A receives the wafer W so that a displacement of the wafer W will fall within the acceptable range, e.g., the wafer W will be held in the reference position on the fork 3A (FIG. 26(*d*), step S11), When the fork 3A has moved to the standby position, data on the positions of peripheral portions of the wafer W is obtained by means of the detection sections 5A to 5D, and the displacement of the wafer W is determined in the above-described manner (FIG. 26(*e*), step S2). The operations of step S2 to step S11 are repeated until the displacement comes to fall within the acceptable range for the temperature control module 93 and the wafer W is transported to the temperature control module 93.

As described hereinabove, in this embodiment the positions of at least three peripheral portions of a wafer W are detected when the fork 3A has received the wafer W from a module and, based on the detected values, the displacement of the wafer W from the reference position on the fork 3A is determined. The detected displacement value is compared with the acceptable range of displacement to determine whether to transport the wafer W to the next module or to transport the wafer W to the wafer stage module 71. Thus, the wafer W is transported to the next module only when the displacement is within the acceptable range. This can prevent collision of the fork 3A with the next module upon transfer of the wafer W to the module, making it possible to securely transfer the wafer W to the next module.

Collision of the fork 3A with a module can be prevented even when the module has a small clearance for the transport arm A3 on transfer of a wafer W. This makes it possible to significantly reduce the chance of stopping transport of a wafer W by the transport arm A3, thereby increasing the operating rate.

When the displacement of a wafer W is so large that the fork 3A will collide with the next module, the wafer W is transported to the wafer stage module 71, and the wafer transfer position of the fork 3A is corrected so that the displacement comes to fall within the acceptable range. Thus, the correction work can be performed automatically even when the displacement is large. This can significantly reduce burden on a worker.

Further, when the displacement of a wafer W is large, multiple corrections of the wafer transfer position of the fork 3A can be performed by transferring/receiving the wafer W to/from the wafer stage module 71 multiple times. Even when there is a limit to the range of correction which can be made by one correction, the large displacement can be reduced gradually by repeating corrections.

Thus, even when the displacement of a wafer W is large, the displacement can be eventually reduced to a value within the acceptable range before transferring the wafer W to the next module. Therefore, even when the fork 3A receives a wafer W from a module at a position largely displaced from the reference position on the fork 3A, for example, on the occurrence of an earthquake, or when the wafer W bounces off the fork 3A upon transfer of the wafer W from the module, the wafer W can be securely transported to the next module.

Further, the operating speed of the transport arm A3 is made lower when transporting a wafer W to the wafer stage module 71 than when transporting a wafer W to the next module. A wafer W can therefore be transported to the wafer stage module 71 while preventing falling of the wafer W from the fork 3A even when the wafer W is held on the fork 3A in a position largely displaced from the reference position.

Figure 27:
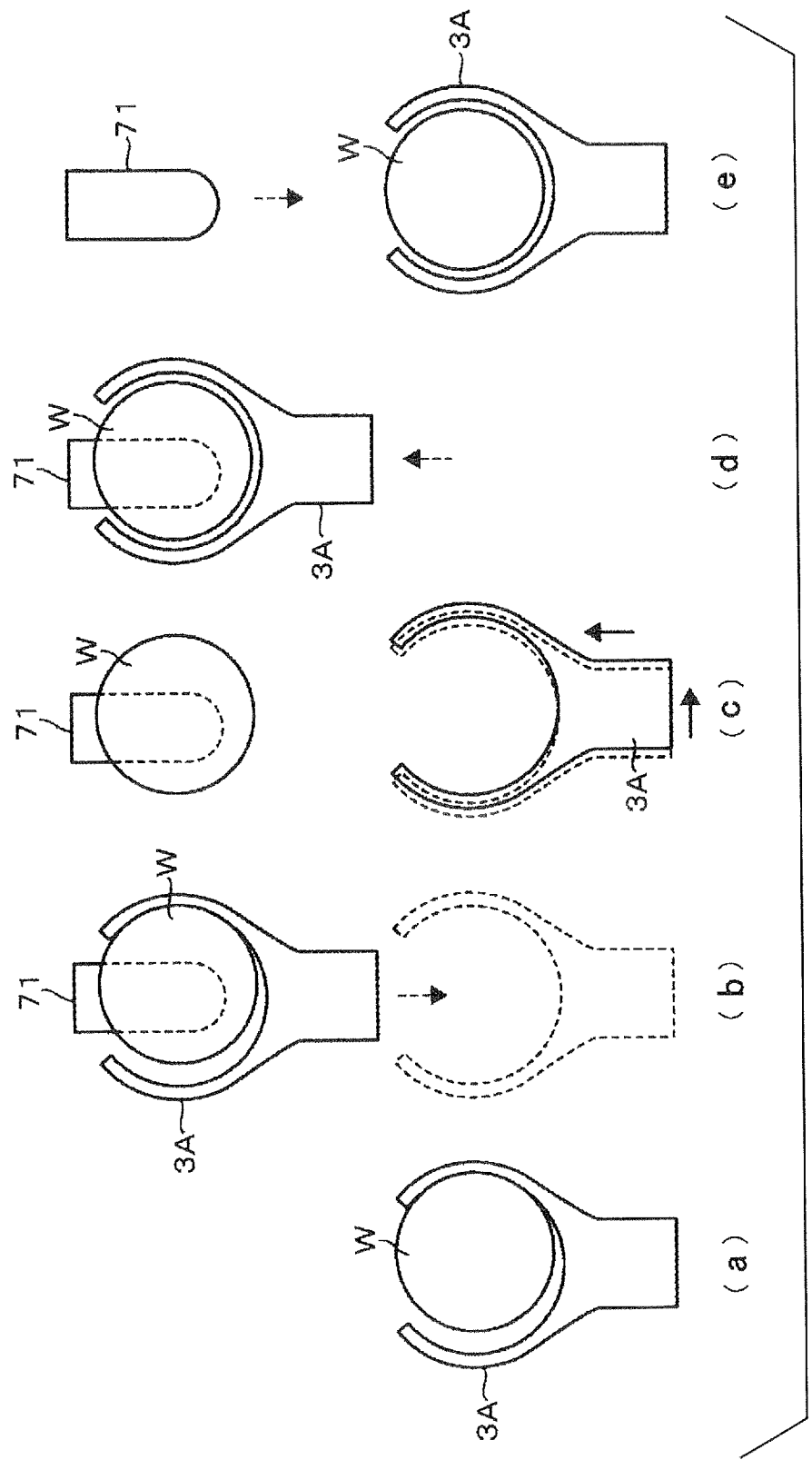
FIG. 27 is a process chart illustrating the action of the resist pattern forming apparatus.

In the above-describe operational process, it is also possible to transfer a wafer W to the wafer stage module 71 without making a correction to transfer the wafer W to the reference position in the wafer stage module 71 (FIG. 27(*b*)), and to correct the wafer transfer position of the fork 3A only when the fork 3A receives the wafer W from the wafer stage module 71, as shown in FIG. 27, so that the displacement falls within the acceptable range. The displacement of a wafer W from the reference position in the wafer stage module 71 is equal to the displacement of the wafer W from the reference position on the fork 3A. Accordingly, by correcting the wafer transfer position of the fork 3A in the X and Y directions when the fork 3A receives a wafer W from the wafer stage module 71 (FIGS. 27(*c*) and 27(*d*)), the wafer W can be received by the fork 3A at a position where the displacement is within the acceptable range.

Figure 28:
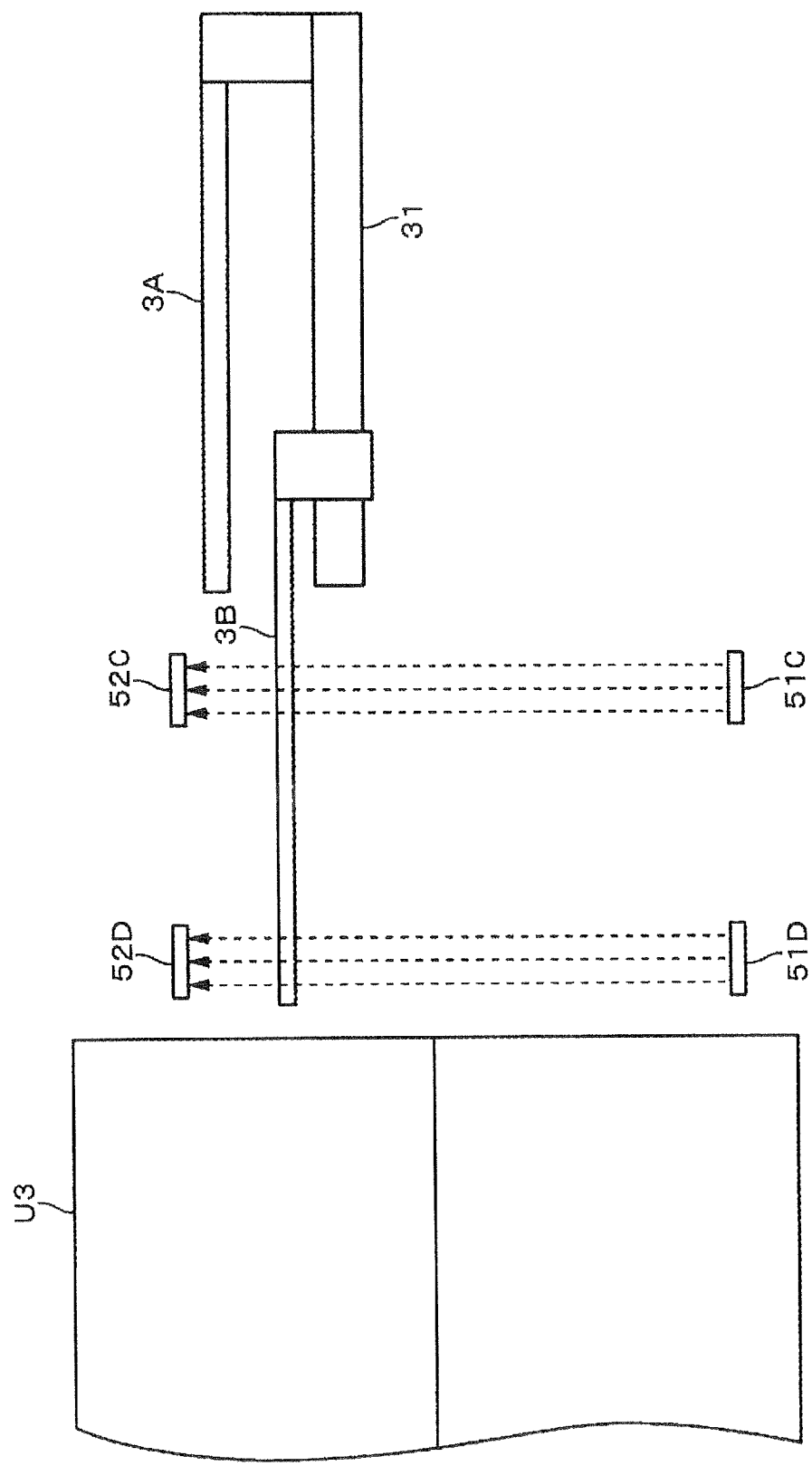
FIG. 28 is a side view showing another example of a set of detection sections.

Other exemplary detection sections will now be described briefly with reference to FIGS. 28 to 30. The detection sections 5A to 5D shown in FIG. 28 are not mounted to the transport arm A3 but are provided in the vicinity of the wafer transport opening of a module. The detection sections 5A to 5D are configured to detect the positions of four peripheral portions of a wafer W when the fork 3A has received the wafer W from the module, and the wafer W has been carried out of the module. The detection sections 5A to 5D of this example have the same construction as the above-described detection sections.

Figure 29:
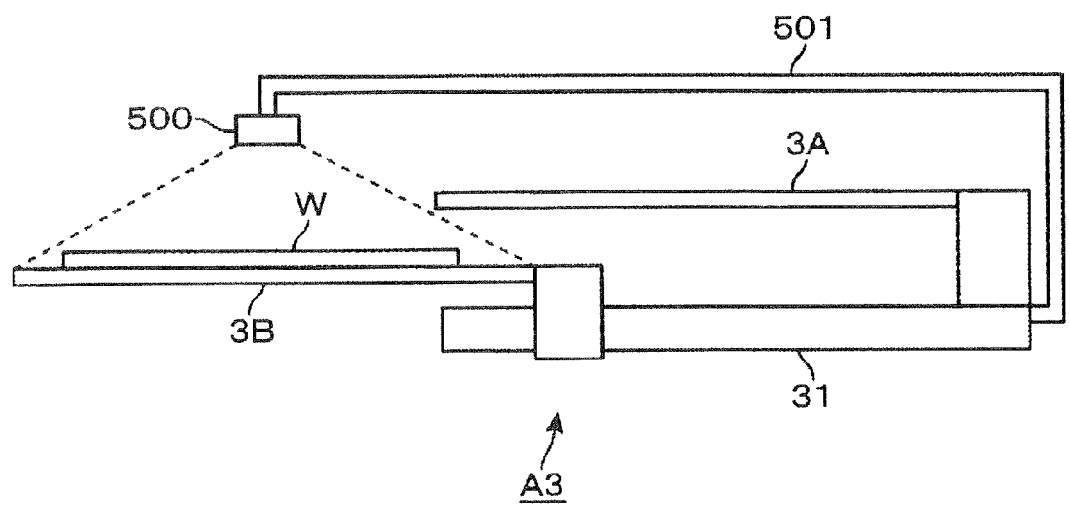
FIG. 29 is a side view showing yet another example of a detection section.

FIG. 29 illustrates the use of a CCD camera 500 as a detection section. The CCD camera 500 is, for example, mounted to the base 31 of the transport arm A3 via a holding member 501 and configured to optically image a wafer W on the fork 3A or 3B when the fork 3A or 3B is in a wafer transfer position, thereby detecting the position of the wafer W on the fork 3A or 3B.

Figure 30:
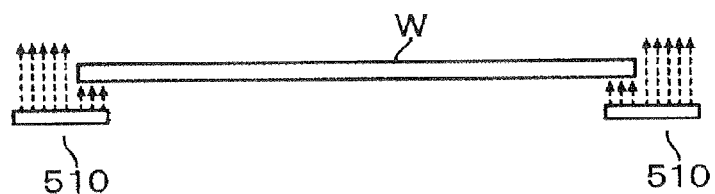
FIG. 30 is a side view showing yet another example of a set of detection sections.

FIG. 30 illustrates the use as a detection section of distance sensors 510 which uses e.g. laser light. Each distance sensor 510 is disposed above or below a wafer W and configured to emit laser light beams from a light source, extending linearly in the radial direction of the wafer W, toward a peripheral portion of the wafer W. The distance sensors 510 may, for example, be disposed in the same positions as the light receivers 52A to 52D shown in FIG. 8. In that case, laser light from each distance sensor 510 is partly blocked by a peripheral portion of the wafer W, and therefore a difference is produced in the distance measured by the distance sensor 510. This enables detection of the position of the wafer W on the fork 3A or 3B.

Even when the displacement of a wafer W on the fork 3A or 3B is out of the range L2 detectable by the detection sections 5, the wafer W may be transported to the wafer stage module 71 and the wafer transfer position of the fork 3A or 3B may be corrected so that the displacement comes to fall within the acceptable range. After the fork 3A or 3B has received a wafer W from the wafer stage module 71, the wafer W may be transported to the next module without detecting the position of the wafer W on the fork 3A or 3B.

When transferring a wafer W to the next module, it is not always necessary to correct the wafer transfer position of the fork 3A or 3B so as to transfer the wafer W to the reference position in the next module. If a narrow acceptable range of displacement is set for the next module, a wafer W can be transferred to a position close to the reference position in the module without making a correction of the wafer transfer position of the fork 3A or 3B.

Figure 31:
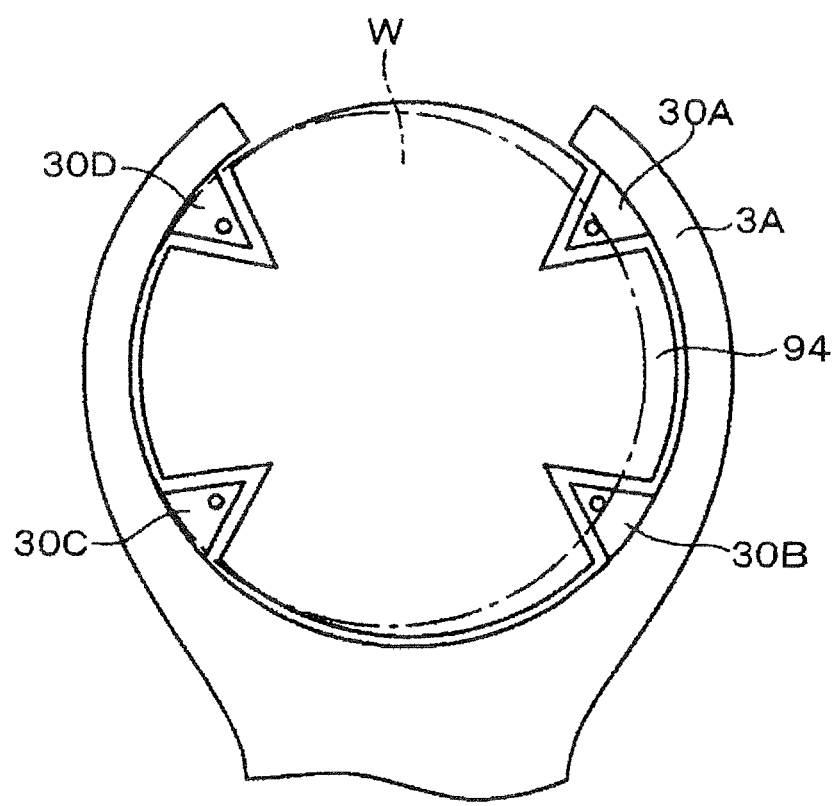
FIG. 31 is a plan view showing the cooling plate of the temperature control module and the transport arm.

Taking the cooling plate 94 as an example, when the displacement of a wafer W is out of the acceptable range in the case of making no correction of the wafer transfer position of the fork 3A or 3B, the wafer W will be transported to a position largely displaced from the reference position on the cooling plate 94, as shown in FIG. 31. Therefore, as described above, the transport arm A3 transfers/receives the wafer W to/from the wafer stage module 71 so that the displacement comes to fall within the acceptable range. In this embodiment the acceptable range of displacement may be determined in consideration of that displacement from the reference position in a module which is acceptable for performing good substrate processing in the module.

The acceptable range of displacement may be common to all the modules or may be set based on an acceptable range of displacement set for each substrate transport mechanism. The acceptable range for a substrate transport mechanism may be set in consideration of prevention of falling of a substrate during transport, prevention of collision of a substrate e.g. with a wall portion, etc.

Instead of the above-described holding member which attracts and holds a substrate by vacuum suction, it is possible to use a holding member for electrostatically attracting and holding a substrate. The use of a holding member for attracting and holding a substrate can prevent a substrate from falling off the holding member. Therefore, the operating speed of a substrate transport mechanism may not necessarily be made low when transporting a substrate to a substrate stage module. Conversely, it may not be necessary to use a holding member of the type which attracts a substrate when a low operating speed of a substrate transport mechanism is used during transport of a substrate to a substrate stage module in order to prevent falling of the substrate.

The shape of a wafer (substrate) stage module is not limited to that described above: any shape of wafer stage module can be used if a wafer W can be transferred to the wafer stage module without collision of the wafer W or a holding member with the wafer stage module even when the wafer W is held on the holding member in a position displaced from the reference position. If this requirement is met, it is possible to use a spin chuck, an alignment guide, a transfer stage, a buffer, etc. as a wafer stage module.

At least one the transfer means C, the transfer arm D, the transport arms A1 to A4, the interface arm F and the shuttle arm E corresponds to the substrate transport mechanism of the present invention. Thus, the present invention may be applied to all or some of these substrate transport mechanisms. A substrate may be temporarily placed on a substrate stage module which is common to a plurality of substrate transport mechanisms, such as to the transfer means C and the transfer arm D, or to the transport arms A1 to A4 and the interface arm F.

What is claimed is:

1. A substrate processing apparatus comprising:
   a substrate transport mechanism for transferring a substrate from one module to another module, the substrate transport mechanism comprises a horizontally movable holding member for holding a substrate and is provided in an area other than the one module and the another module;
   a detection section for detecting the position of the substrate on the holding member after the holding member has received the substrate from the one module and before the holding member transports the substrate to the another module;
   a calculating section for determining a displacement of the substrate on the holding member from a reference position based on the results of detection by the detection section;
   a substrate stage module for temporarily placing thereon the substrate which the substrate transport mechanism has received from the one module is provided in the area where the substrate transport mechanism is provided other than the one module and the another module; and
   a control section configured to compare a detected displacement value, obtained in the calculating section, with an acceptable range of displacement and, when the detected displacement value is within the acceptable range, output a control signal to cause the substrate transport mechanism to transport the substrate to the another module, and when the detected displacement value is out of the acceptable range, output a control signal to cause the substrate transport mechanism to transfer the substrate to the substrate stage module, and then receive the substrate from the substrate stage module so that a detected displacement value comes to fall within the acceptable range.

2. The substrate processing apparatus according to claim 1, wherein the acceptable range of displacement is set for the another module, and wherein the substrate processing apparatus further comprises a storage section for storing the acceptable range in relation to the another module.

3. The substrate processing apparatus according to claim 2, wherein the detection section is provided in the substrate transport mechanism.

4. The substrate processing apparatus according to claim 2, wherein the detection section optically detects the positions of at least three peripheral portions, circumferentially spaced apart from each other, of the substrate on the holding member.

5. The substrate processing apparatus according to claim 2, wherein the control section corrects the substrate transfer position of the holding member so that a detected displacement value falls within the acceptable range at least when the substrate transport mechanism receives the substrate from the substrate stage module.

6. The substrate processing apparatus according to claim 2, wherein the detection section re-detects the position of the substrate on the holding member after the holding member has received the substrate from the substrate stage module and before the holding member transports the substrate to the another module, and wherein the control section compares a detected displacement value, obtained in the calculating section based on the results of the detection, with an acceptable range of displacement and, when the detected displacement value is within the acceptable range, outputs a control signal to cause the substrate transport mechanism to transport the substrate to the another module, or when the detected displacement value is out of the acceptable range, outputs a control signal to cause the substrate transport mechanism to transfer the substrate to the substrate stage module again, and then receive the substrate from the substrate stage module so that a detected displacement value comes to fall within the acceptable range.

7. The substrate processing apparatus according to claim 2, wherein said displacement is a displacement of the center of the substrate on the holding member, determined based on the results of detection by the detection section, from the center of the substrate in the reference position on the holding member.

8. The substrate processing apparatus according to claim 2, wherein the operating speed of the substrate transport mechanism is made lower when transporting the substrate to the substrate stage module than when transporting the substrate to the another module.

9. The substrate processing apparatus according to claim 1, wherein the detection section is provided in the substrate transport mechanism.

10. The substrate processing apparatus according to claim 1, wherein the detection section optically detects the positions of at least three peripheral portions, circumferentially spaced apart from each other, of the substrate on the holding member.

11. The substrate processing apparatus according to claim 1, wherein the control section corrects the substrate transfer position of the holding member so that a detected displacement value falls within the acceptable range at least when the substrate transport mechanism receives the substrate from the substrate stage module.

12. The substrate processing apparatus according to claim 1, wherein the detection section re-detects the position of the substrate on the holding member after the holding member has received the substrate from the substrate stage module and before the holding member transports the substrate to the another module, and wherein the control section compares a detected displacement value, obtained in the calculating section based on the results of the detection, with an acceptable range of displacement and, when the detected displacement value is within the acceptable range, outputs a control signal to cause the substrate transport mechanism to transport the substrate to the another module, or when the detected displacement value is out of the acceptable range, outputs a control signal to cause the substrate transport mechanism to transfer the substrate to the substrate stage module again, and then receive the substrate from the substrate stage module so that a detected displacement value comes to fall within the acceptable range.

13. The substrate processing apparatus according to claim 1, wherein said displacement is a displacement of the center of the substrate on the holding member, determined based on the results of detection by the detection section, from the center of the substrate in the reference position on the holding member.

14. The substrate processing apparatus according to claim 1, wherein the operating speed of the substrate transport mechanism is made lower when transporting the substrate to the substrate stage module than when transporting the substrate to the another module.

15. The substrate processing apparatus according to claim 1, wherein the substrate transport mechanism further comprises a base and the holding member which is configured to be movable back and forth along the base, and the detection section is provided on the base.

16. the substrate processing apparatus according to claim 1, wherein the detection section comprises a light emitting part and a light receiving part which are provided on an upper side and on a lower side of the substrate to detect the substrate peripheral portion held by the holding member in a back position.

17. A substrate processing method for carrying out processing of a substrate while transporting the substrate from one module to another module by a substrate transport mechanism including, the substrate transport mechanism comprises a horizontally movable holding member for holding a substrate and is provided in an area other than the one module and the another module, said method comprising the steps of:
    detecting the position of the substrate on the holding member after the holding member has received the substrate from the one module and before the holding member transports the substrate to the another module;
    determining a displacement of the substrate on the holding member from a reference position based on the results of the detection; and
    comparing the detected displacement value with an acceptable range of displacement and, when the detected displacement value is within the acceptable range, transporting the substrate to the another module by the substrate transport mechanism, and when the detected displacement value is out of the acceptable range, transferring the substrate to a substrate stage module that is provided in the area where the substrate transport mechanism is provided other than the one module and the another module, and then receiving the substrate from the substrate stage module so that a detected displacement value comes to fall within the acceptable range.

18. The substrate processing method according to claim 17, wherein the acceptable range of displacement is set for the another module and stored in relation to the another module.

19. The substrate processing method according to claim 18, wherein a detection section for detecting the position of the substrate on the holding member is provided in the substrate transport mechanism.

20. The substrate processing method according to claim 18, wherein the operating speed of the substrate transport mechanism is made lower when transporting the substrate to the substrate stage module than when transporting the substrate to the another module.

21. The substrate processing method according to claim 17, wherein a detection section for detecting the position of the substrate on the holding member is provided in the substrate transport mechanism.

22. The substrate processing method according to claim 17, wherein the operating speed of the substrate transport mechanism is made lower when transporting the substrate to the substrate stage module than when transporting the substrate to the another module.

23. The substrate processing method according to claim 17, wherein the substrate transport mechanism further comprises a base and the holding member which is configured to be movable back and forth along the base, and the detection section is provided on the base.

24. The substrate processing method according to claim 17, wherein the detection section comprises a light emitting part and a light receiving part which are provided on an upper side and on a lower side of the substrate to detect the substrate peripheral portion held by the holding member in a back position.

\* \* \* \* \*